(12) United States Patent
Hardie et al.

(10) Patent No.: US 11,875,820 B1
(45) Date of Patent: *Jan. 16, 2024

(54) CONTEXT DRIVEN DEVICE ARBITRATION

(71) Applicant: Amazon Technologies, Inc., Seattle, WA (US)

(72) Inventors: Tony Roy Hardie, Seattle, WA (US); Brian Alexander Oliver, Seattle, WA (US); Vikram Kumar Gundeti, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/484,300

(22) Filed: Sep. 24, 2021

Related U.S. Application Data

(63) Continuation of application No. 16/677,205, filed on Nov. 7, 2019, now Pat. No. 11,133,027, which is a
(Continued)

(51) Int. Cl.
  *G10L 15/00* (2013.01)
  *G10L 25/87* (2013.01)
  (Continued)

(52) U.S. Cl.
  CPC ............ *G10L 25/87* (2013.01); *G10L 15/193* (2013.01); *G10L 15/20* (2013.01); *G06F 40/30* (2020.01); *G09B 19/04* (2013.01); *G10L 15/063* (2013.01)

(58) Field of Classification Search
  CPC ...................................................... G06F 3/167
  See application file for complete search history.

(56) References Cited

U.S. PATENT DOCUMENTS 3,770,892 A 11/1973 Clapper
4,531,228 A 7/1985 Noso et al.
(Continued)

FOREIGN PATENT DOCUMENTS

CN 1643571 A 7/2005
CN 102903362 A 1/2013
(Continued)

OTHER PUBLICATIONS

Chinese Office Action dated Jan. 12, 2021 for Chinese Patent Application No. 201680054589.0, a counterpart foreign application of U.S. Pat. No. 9,875,081, 10 pages.
(Continued)

*Primary Examiner* — Daniel Abebe
(74) *Attorney, Agent, or Firm* — Lee & Hayes, P.C.

(57) ABSTRACT

This disclosure describes, in part, context-driven device arbitration techniques to select a speech interface device from multiple speech interface devices to provide a response to a command included in a speech utterance of a user. In some examples, the context-driven arbitration techniques may include executing multiple pipeline instances to analyze audio signals and device metadata received from each of the multiple speech interface devices which detected the speech utterance. A remote speech processing service may execute the multiple pipeline instances and analyze the audio signals and/or metadata, at various stages of the pipeline instances, to determine which speech interface device is to respond to the speech utterance.

20 Claims, 10 Drawing Sheets

Related U.S. Application Data continuation of application No. 15/677,848, filed on Aug. 15, 2017, now Pat. No. 10,482,904.

(51) Int. Cl.
| | |
|---|---|
| *G10L 15/20* | (2006.01) |
| *G10L 15/193* | (2013.01) |
| *G09B 19/04* | (2006.01) |
| *G10L 15/06* | (2013.01) |
| *G06F 40/30* | (2020.01) |

(56) References Cited

U.S. PATENT DOCUMENTS

| | | | |
|---|---|---|---|
| 4,718,092 A | 1/1988 | Klovstad | |
| 5,791,904 A | 8/1998 | Russell et al. | |
| 5,884,249 A | 3/1999 | Namba et al. | |
| 6,009,396 A | 12/1999 | Nagata | |
| 6,092,045 A | 7/2000 | Stubley et al. | |
| 6,219,645 B1 | 4/2001 | Byers | |
| 6,314,393 B1 | 11/2001 | Zheng et al. | |
| 6,453,290 B1 | 9/2002 | Jochumson | |
| 6,591,239 B1 | 7/2003 | McCall et al. | |
| 6,594,630 B1 | 7/2003 | Zlokarik et al. | |
| 6,725,193 B1 | 4/2004 | Makovicka | |
| 6,757,362 B1 | 6/2004 | Cooper et al. | |
| 7,319,959 B1 | 1/2008 | Watts | |
| 8,340,975 B1 | 12/2012 | Rosenberger | |
| 8,600,746 B1 | 12/2013 | Lei et al. | |
| 8,625,819 B2 | 1/2014 | Goldstein et al. | |
| 9,020,823 B2 | 4/2015 | Hoepken et al. | |
| 9,148,742 B1 | 9/2015 | Koulomzin et al. | |
| 9,167,736 B2 | 10/2015 | Shah et al. | |
| 9,293,134 B1 | 3/2016 | Saleem et al. | |
| 9,336,767 B1 | 5/2016 | Barton et al. | |
| 9,600,474 B2 | 3/2017 | Cuthbert et al. | |
| 10,567,477 B2 * | 2/2020 | Sumner et al. | |
| 10,902,855 B2 * | 1/2021 | Min ...................... G06F 3/167 | |
| 2001/0047265 A1 | 11/2001 | Sepe, Jr. | |
| 2002/0077772 A1 | 6/2002 | Squibbs | |
| 2002/0193989 A1 | 12/2002 | Geilhufe et al. | |
| 2003/0138116 A1 | 7/2003 | Jones et al. | |
| 2003/0144845 A1 | 7/2003 | Lee | |
| 2005/0049859 A1 | 3/2005 | Arun | |
| 2006/0095258 A1 | 5/2006 | Jeong et al. | |
| 2009/0015651 A1 | 1/2009 | Togami et al. | |
| 2009/0018831 A1 | 1/2009 | Morita | |
| 2009/0164212 A1 | 6/2009 | Chan et al. | |
| 2009/0204410 A1 | 8/2009 | Mozer et al. | |
| 2009/0299752 A1 | 12/2009 | Rodriguez et al. | |
| 2009/0306981 A1 | 12/2009 | Cromack et al. | |
| 2010/0004930 A1 | 1/2010 | Strope et al. | |
| 2010/0211387 A1 | 8/2010 | Chen | |
| 2011/0093261 A1 | 4/2011 | Angott | |
| 2011/0182481 A1 | 7/2011 | Dernis et al. | |
| 2011/0184740 A1 | 7/2011 | Gruenstein et al. | |
| 2012/0120218 A1 | 5/2012 | Flaks et al. | |
| 2012/0179471 A1 | 7/2012 | Newman et al. | |
| 2013/0024196 A1 | 1/2013 | Ganong, III et al. | |
| 2013/0029684 A1 | 1/2013 | Kawaguchi et al. | |
| 2013/0073293 A1 | 3/2013 | Jang et al. | |
| 2013/0080169 A1 | 3/2013 | Harada et al. | |
| 2013/0132089 A1 | 5/2013 | Fanty et al. | |
| 2013/0289996 A1 | 10/2013 | Fry | |
| 2013/0301837 A1 | 11/2013 | Kim et al. | |
| 2014/0025380 A1 | 1/2014 | Koch et al. | |
| 2014/0058732 A1 | 2/2014 | Labsky et al. | |
| 2014/0074483 A1 | 3/2014 | van Os | |
| 2014/0088952 A1 | 3/2014 | Fife et al. | |
| 2014/0095172 A1 | 4/2014 | Cabaco et al. | |
| 2014/0142929 A1 | 5/2014 | Seide et al. | |
| 2014/0163978 A1 | 6/2014 | Basye et al. | |
| 2014/0184840 A1 | 7/2014 | Konicek | |
| 2014/0274212 A1 | 9/2014 | Zurek et al. | |
| 2014/0278389 A1 | 9/2014 | Zurek et al. | |
| 2014/0278437 A1 | 9/2014 | Shen et al. | |
| 2014/0289323 A1 | 9/2014 | Kutaragi et al. | |
| 2015/0006176 A1 | 1/2015 | Pogue et al. | |
| 2015/0032456 A1 | 1/2015 | Wait | |
| 2015/0046157 A1 | 2/2015 | Wolff et al. | |
| 2015/0088518 A1 | 3/2015 | Kim et al. | |
| 2015/0095026 A1 | 4/2015 | Bisani et al. | |
| 2015/0106085 A1 | 4/2015 | Lindahl | |
| 2015/0133109 A1 | 5/2015 | Freeman et al. | |
| 2015/0154976 A1 | 6/2015 | Mutagi | |
| 2015/0206544 A1 | 7/2015 | Carter | |
| 2015/0228274 A1 | 8/2015 | Leppanen et al. | |
| 2015/0279356 A1 * | 10/2015 | Lee .................... G10L 15/20 704/251 |
| 2015/0310014 A1 | 10/2015 | Yishay | |
| 2015/0331658 A1 | 11/2015 | Domingo Yaguez | |
| 2015/0364143 A1 | 12/2015 | Abildgren et al. | |
| 2015/0371637 A1 | 12/2015 | Neubacher et al. | |
| 2015/0382047 A1 | 12/2015 | Van Os et al. | |
| 2016/0044394 A1 | 2/2016 | Derom | |
| 2016/0063997 A1 | 3/2016 | Nemala et al. | |
| 2016/0077574 A1 | 3/2016 | Bansal et al. | |
| 2016/0125883 A1 | 5/2016 | Koya | |
| 2016/0150575 A1 | 5/2016 | Andersen et al. | |
| 2016/0180853 A1 | 6/2016 | VanLund et al. | |
| 2016/0373269 A1 | 12/2016 | Okubo et al. | |
| 2017/0083285 A1 | 3/2017 | Meyers et al. | |
| 2017/0085696 A1 | 3/2017 | Abkairov | |
| 2017/0085985 A1 | 3/2017 | Kim et al. | |
| 2017/0206896 A1 * | 7/2017 | Ko ...................... G06F 3/16 |
| 2018/0032997 A1 | 2/2018 | Gordon et al. | |
| 2018/0122372 A1 | 5/2018 | Wanderlust | |
| 2018/0210703 A1 | 7/2018 | Meyers et al. | |
| 2018/0277107 A1 * | 9/2018 | Kim .................... G10L 15/28 |
| 2018/0342151 A1 * | 11/2018 | VanBlon ................ G06F 3/011 |

FOREIGN PATENT DOCUMENTS

| | | |
|---|---|---|
| CN | 104145304 A | 11/2014 |
| JP | S57124626 | 8/1982 |
| JP | 2001013994 A | 1/2001 |
| JP | 2001075594 | 3/2001 |
| JP | 2002182688 A | 6/2002 |
| JP | 2003223188 | 8/2003 |
| JP | 2003289587 A | 10/2003 |
| JP | 2008040075 | 2/2008 |
| JP | 2011248025 | 12/2011 |
| JP | 2015520409 A | 7/2015 |

OTHER PUBLICATIONS

The Extended European Search Report dated Sep. 24, 2019 for European Patent Application No. 16849431.8, 8 pages.

Japanese Office Action dated Jul. 20, 2021 for Japanese Patent Application No. 2019-158835, a foreign counterpart to U.S. Pat. No. 9,875,081, 8 pages.

Japanese Office Action dated Dec. 1, 2020 for Japanese Patent Application No. 2019-158835, a counterpart foreign application of U.S. Pat. No. 9,875,081, 6 pages.

The Japanese Office Action dated Jun. 11, 2019 for Japanese Patent Application No. 2018-514981, a counter part of U.S. Pat. No. 9,875,081, 11 pages.

The Korean Office Action dated Jul. 15, 2019 for Korean Patent Application No. 10-2018-7008061, a counterpart of U.S. Pat. No. 9,875,081, 15 pages.

Office Action for U.S. Appl. No. 15/677,848, dated Feb. 8, 2019, Hardie, "Context Driven Device Arbitration", 10 pages.

Office Action for U.S. Appl. No. 15/876,858, dated Apr. 14, 2021, Meyers, "Device Selection for Providing a Response", 24 Pages.

Office Action for U.S. Appl. No. 15/876,858, dated Oct. 9, 2020, Meyers, "Device Selection for Providing a Response", 17 Pages.

Office Action for U.S. Appl. No. 16/677,205, dated Nov. 2, 2020, Hardie, "Context Driven Device Arbitration", 8 Pages.

Office Action for U.S. Appl. No. 15/876,858, dated Dec. 31, 2018, Meyers, "Device Selection for Providing a Response", 18 pages.

Office Action for U.S. Appl. No. 15/876,858, dated Dec. 31, 2019, Meyers, "Device Selection for Providing a Response", 18 Pages.

(56) References Cited

OTHER PUBLICATIONS

Office action for U.S. Appl. No. 14/860,400, dated Mar. 1, 2017, Meyers et al., "Device Selection for Providing a Response", 18 pages.
Office Action for U.S. Appl. No. 15/876,858, dated May 3, 2018, Meyers et al., "Device Selection for Providing a Response", 9 pages.
Office Action for U.S. Appl. No. 15/876,858, dated May 30, 2019, Meyers, "Device Selection for Providing a Response", 15 pages.
Office action for U.S. Appl. No. 14/860,400, dated Jul. 28, 2016, Meyers et al., "Device Selection for Providing a Response", 32 pages.
PCT Search Report and Written Opinion dated Dec. 9, 2016 for PCT Application No. PCT/US16/52688, 9 pages.
Machine translation of JP2003223188, Arisei Masahide, "Voice Input System, Voice Input Method, and Voice Input Program" Aug. 8, 2003, 28 pages.

\* cited by examiner

CONTEXT DRIVEN DEVICE ARBITRATION

RELATED APPLICATIONS

This application claims priority to and is a continuation of U.S. patent application Ser. No. 16/677,205, filed on Nov. 7, 2019, which will issue as U.S. Pat. No. 11,133,027 on Sep. 28, 2021, which is a continuation of U.S. patent application Ser. No. 15/677,848, filed on Aug. 15, 2017, now known as U.S. Pat. No. 10,482,904, which issued on Nov. 19, 2019, the entire contents of which are incorporated herein by reference.

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including desktops, tablets, entertainment systems, and portable communication devices. In some instances, multiple of these voice-enabled computing devices may be in proximity to a user to such that each voice-enabled computing device detects a voice command from the user.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
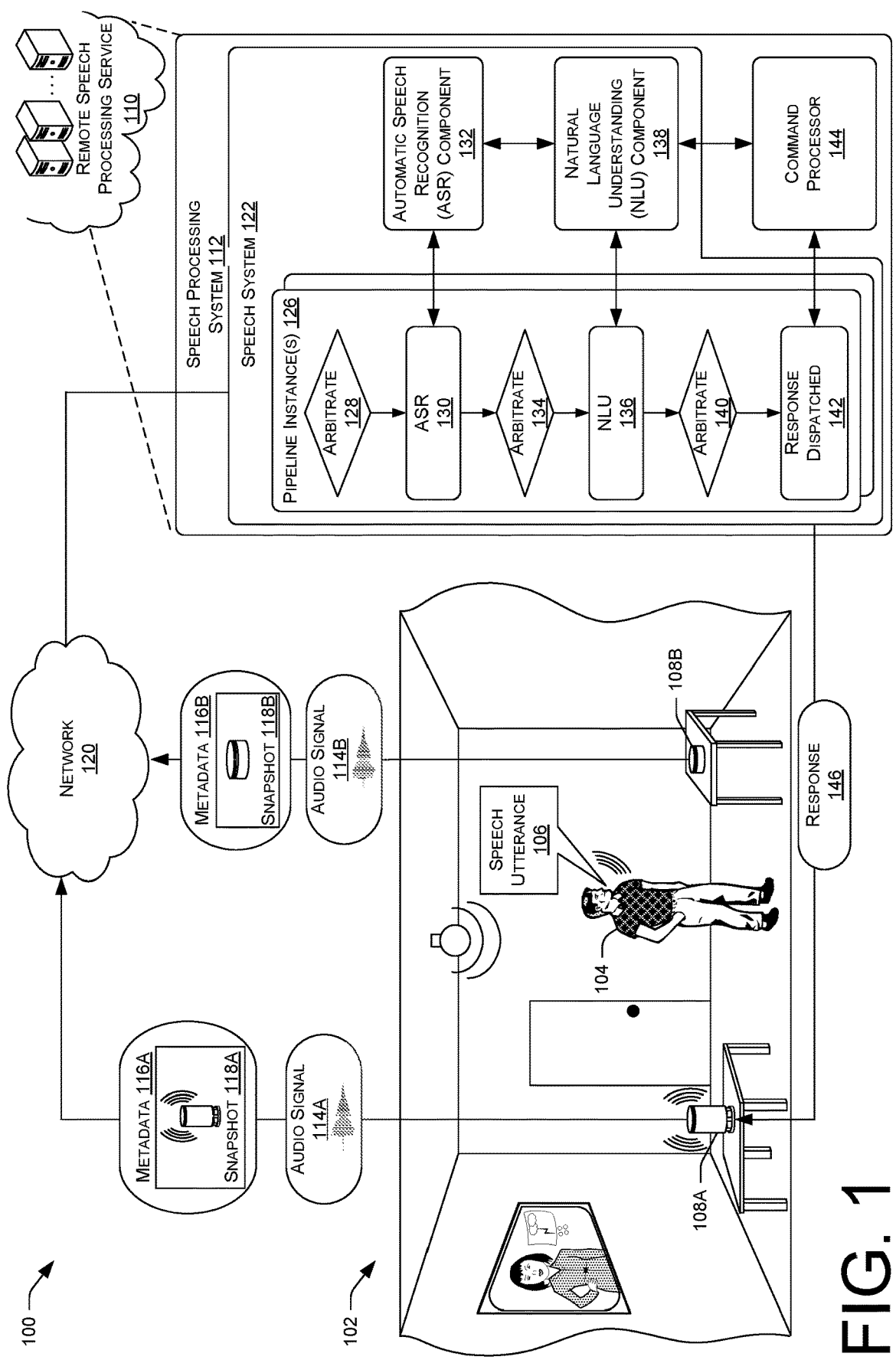
FIG. 1 illustrates a schematic diagram of an illustrative environment in which a user issues a speech utterance, multiple speech interface devices detect the speech utterance, and a speech processing system of a remote service performs arbitration to determine which of the speech interface devices will respond to the speech utterance.

With the proliferation of voice-enabled computing devices, or "speech interface devices," users are able to interact with more of their computing devices through speech. For instance, a user may issue a command via a speech utterance to a speech interface device to perform an operation, such as turning on/off an appliance, streaming music, performing a telephone call, etc. Due to the usefulness of these speech interface devices, users often have multiple devices in an environment, such as their home. While multiple speech interface devices may increase user satisfaction by allowing a user to issue speech utterances including commands throughout their home, in situations in which multiple speech interface devices are near each other, such as within a single room or in adjoining rooms, each of the speech interface devices may receive the user utterance and each device may independently attempt to process and respond to the user utterance as if it were two separate utterances. Traditionally, a speech interface device might be selected from among the multiple speech interface devices to provide a response to an utterance using fairly limited types of data. For example, a speech interface device may be selected by comparing data such as signal amplitudes of audio signals generated by each speech interface device which represent the speech utterance, or signal-to-noise ratios for each of the audio signals generated by each speech interface device.

This disclosure describes, at least in part, techniques for using contextual information to perform device arbitration to select the most appropriate speech interface device, from among multiple speech interface devices which detect a speech utterance from a user, to perform an action responsive to a command included in the speech utterance. In some examples, the arbitration techniques used to select a speech interface device to respond to a speech utterance may be driven by varying types of contextual information. For instance, the contextual information may include information associated with the speech utterance detected by the multiple speech interface devices (e.g., signal-to-noise ratios, proximity of the user to each speech interface device, words included in the utterance, an intent of the user who issued the utterance, etc.) the current device states (e.g., conducting a telephone call, outputting an alarm sound, etc.), or other types of contextual information.

To perform contextually driven device arbitration, speech interface devices are often configured with various sensors and components for collecting different types of data, or metadata, which may be useful in selecting a speech interface device to perform an operation which is responsive to a user's speech utterance. For example, the speech interface devices may include various types of proximity sensors to determine proximity metadata which indicates a distance the user is away from each speech interface device. The speech interface devices may each include microphones configured to generate audio signals representing the speech utterance issued by the user. The speech interface devices may be configured with components to determine various types of metadata for the audio signals, such as a signal-to-noise ratio of the audio signal, the level of voice presence detected in the audio signal, an amplitude of the audio signal, etc. In some instances, each speech interface device may further include various imaging sensors (e.g., camera, thermal imaging sensor, etc.) to detect a position of a user, or an orientation of a user relative to the speech interface device. The image metadata collected by these imaging sensors may be analyzed, such as by using facial recognition or object recognition, and it may be determined an orientation of the user when the speech utterance was issued (e.g., whether the user was looking at a particular speech interface device when the utterance was issued). In some instances, components of the speech interface devices may be configured to determine a "device state" of the speech interface devices when the speech utterance was issued. Device states may generally correspond to what activities the speech interface devices were performing when the speech utterance was issued. For instance, a device state may include speech interface devices performing a phone call, streaming music, causing an alarm to go off (e.g., kitchen timer), etc. Accordingly, speech interface devices may be configured with various sensors and components for generating audio signals representing a speech utterance, and for collecting metadata which provides context surround the speech interface devices when the speech utterance was detected.

While speech interface devices may perform some types of pre-processing, often speech interface devices may have relatively low functionality. For instance, speech interface devices may comprise battery powered devices which are configured to merely serve as an interface or "middle man" between a remote server and a user. In this way, the more intensive processing involved in the arbitration techniques may be performed using large amounts of resources of remote services, which may extend battery life performance of speech interface devices.

Thus, in some examples, some or all of the arbitration techniques may be performed by a remote speech processing service (e.g., "cloud-based service," "software as a service (SaaS)," "network accessible platform," etc.) which receives data from the speech interface devices. Each of the speech interface devices may access the remote speech processing service through a communications network, such as the internet, to provide the remote speech processing service with the captured audio signals and the various types of contextual information detected or determined by the speech interface devices. In various examples, the speech interface devices may receive a "wake" trigger (e.g., wake word, button input, etc.) which indicates to the speech interface devices that a user is speaking a command, and the speech interface devices begin streaming metadata and the audio signals representing the spoken command to the remote network-based speech service.

In various examples, multiple speech interface devices may detect the same user speech utterance, and independently stream respective audio signals and metadata to the remote speech processing service to attempt to process and respond to the same speech utterance as if it were two separate utterances. When the remote speech processing service receives these multiple streams of audio signals and metadata, there are various issues that must be resolved. For example, the remote speech processing service must (i) determine whether the audio signals are duplicate signals to refrain from processing both signals, and (ii) determine which of the speech interface devices is the best device to respond to the command in the speech utterance. To resolve each of these issues, the remote speech processing service may employ various arbitration techniques using one or more parallel pipeline processes which analyze the respective audio signals and metadata.

These parallel pipeline processes which are used to analyze multiple audio signals and metadata received from different speech interface devices may include various stages at which the audio signal and/or metadata are analyzed to determine whether device arbitration can be completed with a high enough confidence level. For example, to determine which of the speech interface devices is the best device, or most appropriate device, to respond to the command in the speech utterance, various stages of analysis are performed on the audio signals and metadata. A first stage may involve analyzing the metadata associated with the speech utterance and associated with the audio signal. For example, the signal-to-noise ratios, device states, audio signal amplitudes, and other types of contextual data are initially analyzed. In some examples, each of the speech interface devices which streamed the audio signal may be assigned a confidence score based on this initial analysis which indicates a likelihood that the particular speech interface device is to respond to the speech utterance. At this initial stage, certain contextual data may cause confidence values for speech interface devices to be higher or lower. For example, if a speech interface device's device state indicates that the speech interface device had started outputting an alarm sound a few seconds before the speech utterance was received, this may suggest that the user is requesting the alarm be turned off, which in turn suggests that this particular speech interface device is the best device to respond to the speech utterance. After determining the confidence scores for each speech interface device, the remote speech processing service may determine whether one of the confidence values is higher than a threshold confidence value at which a speech interface device can be selected. If one of the confidence values is higher than the threshold confidence value (e.g., 85% confidence, 90% confidence, 100% confidence, etc.), then the corresponding speech interface device may be selected to respond to the speech utterance, and device arbitration ends after the initial stage.

In some examples, the confidence values for each speech interface device may not be higher than the threshold confidence value, and additional analysis of the audio signal and/or metadata may be required. In some examples, a second analysis stage may include performing automatic speech recognition (ASR) on the audio signals to determine text data, or textual words, included in the speech utterance. The remote speech processing service may analyze the textual data to identify words in the speech utterance which may indicate which speech interface device is to respond to the speech utterance. Based on the analysis of the textual data, weighting factors may be applied to the confidence scores to more heavily, or more lightly, weight the confidence scores. For instance, if the textual data indicates that the speech utterance includes certain verbs or nouns, such as "turn off the alarm," then the remote speech processing service may know that the word "alarm" corresponds to the device state of the speech interface device which is outputting the alarm sound. As another example, if the textual data indicates that the speech utterance includes a name of a device, such as "stop playing music from my kitchen device," then the remote speech processing service may apply a weighting factor which increases the confidence score of a speech interface device that previously was named "kitchen device" by the user. Similar to the initial analysis stage, the remote speech processing service determines whether the weighted confidence scores are higher than a threshold score, and if one of the confidence scores is higher, the corresponding speech interface device is selected to respond to the speech utterance.

In various examples, the weighted confidence scores may not be higher than a threshold confidence score after performing ASR, and a third stage of analysis must be performed. In such examples, the remote speech processing service may perform natural language understanding (NLU) on the textual data determined using ASR on the audio signals to determine an intent expressed by the user in the speech utterance. For example, if the user issued a command to "please hang up," the remote speech processing service may determine that the user's intent is to have the speech interface device which is conducting a phone call end the phone call. Thus, using NLU techniques, the remote speech processing service may apply additional weighting factors to the weighted confidence scores. The remote speech processing service may then analyze the weighted confidence scores and make a final decision as to which speech interface device is to respond to the command in the speech utterance. In some examples, the remote speech processing service may determine whether the final weighted confidence scores are higher than a threshold confidence score, and select the speech interface device whose weighted confidence score is higher than the threshold to respond to the command. In other examples, the remote speech processing service may simply compare the weighted confidence scores with each other and select the speech interface device with the highest weighted confidence score to respond to the speech utterance.

In some examples, a command processor may make the final decision as to which speech interface device is to respond to the command in the speech utterance. For example, the command processor may determine device states for the speech processing devices which detected the speech utterance, and may further be provided with the text data determined using the ASR and with the intent determined using the NLU techniques, and make a final determination as to which speech interface device is to respond to the command. Further, the command processor may be provided with the confidence scores determined at the various stages of arbitration. The command processor may include one or more domain speechlets which determine a response for the processed speech utterance, and the command processor may determine which of the speech interface devices is to respond to the speech utterance. In some examples, the command processor may route identified intents to the appropriate speechlets based on the intent determined using NLU. For example, the speechlets may comprise specialized domains and/or devices for responding to various intents, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), and other types of domains. The speechlets (e.g., speechlet devices, speechlet domains, etc.) may, in some examples, comprise software running on a cloud-based instance (e.g., virtual device instance) of the remote speech processing service, include software and/or code which is saved in one or more storage devices of the remote speech processing service and executed by one or more devices at the remote speech processing service, and/or executed by one or more client devices (e.g., speech interface devices). In some examples, the NLU output may include a command to play music (play music intent), the command processor may route the intent to a music domain speechlet configured to execute a music playing command. Additionally, the command processor may be configured with components to make the final determination as to which of the speech interface devices is to respond to the speech utterance. For example, if the NLU output may indicate that the speech command is a request to hang up a call being via a speech interface device, the command processor may route the intent to a smart home speechlet which controls connected smart devices (such as the phone), and cause the domain speechlet to execute a hang up command. Further, the command processor may analyze the context to determine which of the speech interface devices is to execute the command. For instance, if the device state of one of the speech interface devices is conducting a phone call, and the other speech interface device is idle, then the command processor may determine that the command to hang up the phone call is intended for the speech interface device conducting the phone call. In this way, a command processor may use context data, such as device states, to make a final decision using a determined intent and/or text data to identify which speech interface device is to respond to the speech utterance.

In some examples, the command processor may determine confidence scores for each of the speech interface devices, where the confidence scores each indicate a likelihood that a speech interface device is to respond to, or perform an action responsive to, the speech utterance. For instance, if a device state of one of the speech interface devices is that an alarm is going off, and the device state of another speech interface device is idle, then the speech interface device having the alarm going off may have a higher confidence score applied to it compared to the idle speech interface device, and may in turn be selected to respond to the speech utterance based on the higher confidence score determined by the device states.

In some examples, the command processor may further receive the various confidence scores determined by the speech system to determine which of the speech interface devices is to respond to the utterance. Thus, the command processor may use various types of data, such as text data determined using ASR, an intent determined using NLU, contextual data such as device states, and/or confidence scores determined in the pipeline instances.

Using the techniques described above, and in more detail below with respect to the figures, a remote speech processing service may analyze audio signals, as well as additional contextual metadata, for speech interface devices and perform arbitration techniques to select the most appropriate speech interface device to respond to a speech utterance from amongst multiple speech interface devices that detected the speech utterance. Conventionally, a speech interface device may have been selected because the speech utterance was detected as being louder at the speech interface device compared to the other speech interface devices which detected the speech utterance. However, without using context associated with each of the speech interface devices, as well as the speech utterance, the best suited speech interface device may not be selected to respond to the speech utterance. For example, if a user is in a bedroom which has a bedroom device, a kitchen device begins outputting an alarm sound, and the user issues a command to turn off the alarm, traditionally the bedroom device may be selected because the amplitude of the audio signal generated by the bedroom device is higher than the kitchen device. However, using the techniques described herein, context surrounding speech interface devices and speech utterances is analyzed for device arbitration to determine which speech interface device is best suited to respond to the speech utterance.

In some examples, the command processor may further account for various permission-related concerns. As an example, the command processor may include a video domain speechlet which is configured to execute commands for presenting videos on the speech interface devices and/or other secondary devices (e.g., televisions, displays, personal computing devices, etc.) associated with the speech interface devices. As an example, the video domain speechlet may be provided with contextual information such as a speaker identification of the user which issued the speech command, and the speaker identification may be associated with a user profile (e.g., parent profile, child profile, etc.). Depending on the user profile, the command processor may allow, or disallow, certain speech commands. For instance, a child profile may be unable to hang up a phone call happening in another room in which a child is engaged in the phone call, but a child profile cannot hang up a phone call if a parent is engaged in the phone call.

As noted above, when audio signals are received from two or more types of arbitration must be performed. For example, the remote speech processing service must (i) determine whether the audio signals are duplicate signals to refrain from processing both signals, and (ii) determine which of the speech interface devices is the best device to respond to the command in the speech utterance. As described more fully below, both of these arbitration's may be performed simultaneously. In some examples, it may be determined in the first or second stage of arbitration that the audio signals are duplicate signals, in which case only one of the audio signals continues to be analyzed. For instance, if the signals are duplicates of the same speech utterance, the ASR and NLU techniques will result in the same outcomes regardless of which signal is analyzed, but processing power and time may be conserved by only analyzing one of the audio signals to determine which speech interface device is to respond to the speech utterance. In some examples, the audio signal selected for analysis may not necessarily correspond to the speech interface device selected to respond to the utterance. For instance, as noted above, a bedroom device may have generated the highest quality audio signal, which may be the best audio signal to use for ASR and NLU, but the device selected to turn off the alarm may still be the kitchen device as the alarm is going off on the kitchen device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram 100 of an illustrative environment 102 in which a user 104 issues a speech utterance 106, multiple speech interface devices 108 (e.g., 108A, 108B, etc.) detect the speech utterance 106, and a remote speech processing service 110 having a speech processing system 112 performs arbitration to determine which of the speech interface devices 108 responds to the speech utterance 106.

In some examples, the speech interface devices 108 may each have one or more microphones that are used to capture user speech, such as speech utterance 106, and one or more speakers that are used to play speech (e.g., dialogue) and content. In some embodiments, the speech interface devices 108 may be designed to operate from a fixed location, and in other embodiments, the speech interface devices 108 may be portable or mobile. For instance, the speech interface devices 108 may comprise handheld devices or other mobile devices, such as smartphones, tablet computers, media players, personal computers, wearable devices, various types of accessories, and so forth.

As shown in the environment 102, the user 104 is interacting with the speech interface devices 108 through a speech utterance 106. For example, the speech interface devices 108 may receive spoken commands from the user 104 via the speech utterance 106, and provide services in response to the commands. In some examples, the speech interface devices 108 may detect a predefined trigger expression or word (e.g., "awake"), which may be followed by instructions or directives (e.g., "please end my phone call," "please turn off the alarm," etc.). Services provided by the speech interface devices 108 in conjunction with the remote speech processing service 110 may include performing actions or activities, rendering media, obtaining, and/or providing information, providing information via generated or synthesized speech via the speech interface devices 108, initiating Internet-based services on behalf of the user 104, and so forth.

The speech interface devices 108 may receive or capture sound corresponding to the speech utterance 106 of the user via one or more microphones. In certain implementations, the speech utterance 106 may include or be preceded by a wakeword or other trigger expression or event that is spoken by the user 104 to indicate that subsequent user speech is intended to be received and acted upon by the speech interface devices 108 and/or remote speech processing service 110. The speech interface devices 108 may detect the wakeword and begin streaming audio signals to the remote speech processing service 110. In some instances, the speech interface devices 108 may operate in a low-functionality mode and analyze sound using ASR processing. When the wakeword is detected using ASR, the speech interface devices 108 may begin streaming the audio signal, and other data, to the remote speech processing service 110. The wakeword maybe a reserved keyword that is detected locally by the speech interface devices 108, such as by using an expression detector that analyzed audio signals produced by the microphones of the speech interface devices 108 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In certain embodiments, an expression detector of the speech interface devices 108 may be configured to analyze the audio signal to produce a score indicating a likelihood that the wakeword is represented in the audio signal. The expression detector then compares the score to a threshold to determine whether the wakeword will be declared as having been spoken. For instance, the ASR techniques may involve using a Hidden Markov Model (HMM) recognizer that performs acoustic modeling of the audio signal and compares the HMM model of the audio signal to one or more reference HMM models that have been created by training for a specific trigger expression.

In the example illustrated in environment 102, the user issues a speech utterance 106 subsequent to a wakeword, which the speech interface devices 108A and 108B each detect or capture. Each of the speech interface devices 108A and 108B produce an audio signal representing the speech utterance 106. Additionally, the speech interface devices 108A and 108B may each collect or determine additional metadata associated with the speech utterance 106, and/or the circumstances involving the speech interface devices 108A and 108B. The speech interface devices 108A and 108B may each send their respective metadata and audio signals to the remote speech processing service 110. For example, the speech interface device 108A may generate an audio signal 114A, and speech interface device 108B may generate audio signal 114B. Similarly, the speech interface device 108A may collect and/or determine metadata 116A, and speech interface device 108B may collect and/or generate metadata 116B.

The metadata 116A and 16B may comprise various information that can be used to determine which of speech interface devices 108A or 108B is to respond to a command included in the speech utterance 106. The types of metadata 116A and 116B, which will be described further below with respect to FIG. 2 and FIG. 3, may include information such as image data which represents images of the environment 102 of the user 104, signal/contextual attribute data such as signal-to-noise ratios and audio signal amplitudes, and/or proximity data. The proximity data may include physical proximity, such as the proximity of the user 104 relative to each of the speech interface devices 108, and temporal proximity, such as a time when the speech utterance 106 was detected by each of the speech interface devices 108. For example, metadata 116A may include a first timestamp indicating the time at which the speech utterance 106 was received by the speech interface device 108A and the metadata 116B may include a second timestamp indicating the time at which the speech utterance 106 was received by the speech interface device 108B. The metadata 116A and 116B may include other information such as the signal energy of the audio signals 114A and 114B and/or a level of voice presence in the audio signals 114A and 114B as detected by the speech interface devices 108A and 108B.

In some examples, the metadata 116A and 116B may also include snapshots 118A and 118B, respectively, which indicate device states of the speech interface devices 108A and 108B, respectively. The snapshots 118A and 118B may comprise device states which indicate current activities or operations of the speech interface devices 108 before, during, and/or after the speech utterance 106 is detected by the speech interface devices 108. Device states of the speech interface devices 108 may include, for example, conducting a telephone call, outputting an alarm sound, streaming audio (e.g., music, audio books, etc.), conducting a dialogue with user 104, performing online searches, controlling appliances in a house, or any other type of activity for which a speech interface device 108 can be configured to perform. As shown in the example of FIG. 1, the snapshot 118A may generally represent a state of the speech interface device 108A as having an alarm sound being output due to an alarm going off on the speech interface device 108A. Conversely, the snapshot 118B may represent that the speech interface device 108B is not in any active state other than streaming the audio signal 114B.

While illustrated the snapshots 118A and/or 118B are described as being sent up to the speech processing system 112 when a speech utterance is detected 106, in other examples, the speech processing system 112 may also store indications of snapshots 118A and/or 118B rather than receiving them each time. For example, the speech processing system 112 may receive an indication that the user 104 set an alarm, and know what time the alarm will sound. Thus, once the alarm is sounding, the speech processing system 112 may already have the snapshots 118A and/or 118B stored and does not receive the snapshots 118A and/or 118B every time a speech utterance 106 is detected. Similarly, some or all of the metadata 116A and/or 116B may be stored at the speech processing system 112 prior to the speech utterance 106 being captured by the speech interface devices 108A and/or 108B.

In some examples, the speech interface devices 108A and 108B may continuously collect or monitor, using various sensors, the environment 102 and the device states, to collect and determine the metadata 116. In other examples, responsive to a wakeword, the speech interface devices 108A and 108B may use the various sensors to collect and determine the metadata while streaming the audio signals 114A and 114B to the remote speech processing service 110. Regardless of how the collecting of metadata 116A and 116B and triggering of the metadata 116A and 116B to be sent to the remote speech processing service 110, the speech interface devices 108A and 108B may each send their respective audio signals 114A and 114B, along with their respective metadata 116A, and 116B, over one or more networks 120 to the remote speech processing service. The one or more networks 120 may include any viable communication technology, such as wired and/or wireless modalities and/or technologies. Networks 120 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

Upon receiving the audio signals 114A and 114B, and the metadata 116A and 116B, the speech processing system 112 of the remote speech processing service 110 may perform device arbitration to determine which of the speech interface devices 108A or 108B is to respond to the speech utterance 106. In some instances, the remote speech processing service 110 may be a network-accessible service implemented by multiple server computers that support the speech interface devices 108 in homes or other premises of the user 104. The speech processing system 112 may comprise a speech system 122 for analysis and determination of a responsive action, and to perform various processing techniques on the audio signals 114A and 114B (e.g., ASR, NLU, etc.).

In some examples, the speech system 122 may include one or more pipeline instances 126. Generally, each pipeline instance 126 may correspond to one of the speech interface devices 108. Each pipeline instance 126 may include an ordered series of pipeline processing stages or steps for processing the received audio signals 114A and 114B, and the metadata 116A and 116B. A first speech processing pipeline instance 126 processes the audio signal 114A and corresponding metadata 116A, which are received from the speech interface device 108A. A second speech processing pipeline instance 126 receives and processes the audio signal 114B and corresponding metadata 116B, which are received from the speech interface device 108B. A different server, or computing device, of the remote speech processing service 110 may implement each pipeline instance 126 such that the pipeline instances 126 are executed in parallel. Each pipeline instance 126 receives an audio signal 114 from a corresponding speech interface device 108 and, unless the pipeline instance 126 is aborted as described with reference to FIGS. 6 and 7, processes the respective audio signal 114 and metadata 116. In operation, all but one of the pipeline instances 126 are aborted before completion so that only a single one of the pipeline instances 126 returns a response to the best suited speech interface device 108 for responding to the speech utterance 106.

In some examples, an arbitration component of the remote speech processing service 110 may perform various arbitration steps or stages of the pipeline instances 126. A first arbitration stage 128 for each pipeline instance 126 may include analyzing the metadata 116 and/or attributes of the audio signals 114. For example, the signal-to-noise ratios, device states (e.g., snapshots 118A and 118B), audio signal amplitudes, and other types of contextual data are initially analyzed. In some examples, each of the speech interface devices 108 which streamed the audio signals 114 may be assigned a confidence score based on this initial analysis which indicates a likelihood that the particular speech interface device 108 is to respond to the speech utterance. At this initial stage, certain contextual data may cause confidence values for speech interface devices to be higher or lower. For example, the snapshot 118A indicates that the device state of the speech interface device 108A indicates that the speech interface device 108A is outputting an alarm sound before and/or during reception of the speech utterance 106, which may suggest that the user 104 is requesting the alarm be turned off, which in turn suggests that speech interface device 108A is the best device to respond to the speech utterance. After determining the confidence scores for each speech interface devices 108, the arbitration component of the remote speech processing service 110 may determine whether one of the confidence values is higher than a threshold confidence value at which a speech interface device can be selected. If one of the confidence values is higher than the threshold confidence value (e.g., 85% confidence, 90% confidence, 100% confidence, etc.), then the corresponding speech interface device 108 may be selected to respond to the speech utterance 106, and the device arbitration of the pipeline instances 126 ends after the first arbitration stage 128 ends.

In some examples, the confidence values for each speech interface device 108 may not be higher than the threshold confidence value, and additional analysis of the audio signals 114 and/or metadata 116 may be required. In some examples, the pipeline instances 126 may include an ASR stage 130 where automated speech recognition is performed on the one or more of the audio signals 114 to determine text data, or textual words, included in the speech utterance 106. In some instances, an ASR component 132 of the speech processing system 112 may be called, or used, to perform the ASR on the one or more audio signals 114 at ASR stage 130. In some examples, the ASR stage 130 may result in ASR confidences scores representing the likelihood that a particular set of words determined in the ASR 130 matches those spoken in the speech utterance. For instance, at the ASR stage 130, the ASR component 132 may determine a confidence or likelihood that a particular word which matches the sounds would be included in the sentence at the specified location (e.g., using a language or grammar model). Thus, each potential textual interpretation of the spoken utterance 106 (hypothesis) is associated with an ASR confidence score.

After performing ASR on the one or more audio signals 114, the arbitration component may perform a second arbitration stage 134. The arbitration component may analyze the confidence scores or hypothesis determined for each of the audio signals 114A and 114B which represent the likelihood that a particular set of words determined for each of the audio signals 114A and 114B matches those spoken in the utterance 106. At the second arbitration state 134, the speech system 122 may determine which confidence score is higher, which indicates which text data determined for each of the audio signals 114A or 114B is more likely to match the speech utterance 106. For example, if it is more likely that text data determined for the audio signal 114A has a higher confidence score that the words included in the text data correspond to the speech utterance 106 than the text data determined for the audio signal 114B, then the speech system 122 may apply a higher weighting factor to the speech interface device 108A being selected to perform a response to the speech utterance 106.

In various examples, the weighted confidence scores may not be higher than a threshold confidence score after performing the ASR stage 130 and the second arbitration stage 134, and additional analysis must be performed in the pipeline instances 126. At NLU stage 136, natural language understanding techniques may be performed on the textual data determined at ASR stage 130 to determine an intent expressed by the user 104 in the speech utterance 106. For example, if the user 104 issued a command to "please turn off the alarm," NLU stage 136 may determine that the user's intent is to have the speech interface device 108A that is outputting the alarm sound turn off the alarm. In some examples, an NLU component 138 of the speech processing system 112 may be called or used to perform the NLU stage 136.

Upon determining the intent of the user 104 at NLU stage 136, the arbitration component may perform a third arbitration stage 140. Based on the intent determined in NLU stage 136, the arbitration component may apply additional weighting factors to the weighed confidence scores received from the second arbitration stage 134. The remote speech processing service 110 may then analyze the weighted confidence scores and make a final decision as to which speech interface device 108 is to respond to the command in the speech utterance 106. In some examples, the remote speech processing service 110 may determine whether the final weighted confidence scores are higher than a threshold confidence score, and select the speech interface device 108 whose weighted confidence score is higher than the threshold to respond to the command. In other examples, the remote speech processing service 110 may simply compare the weighted confidence scores with each other and select the speech interface device 108 with the highest weighted confidence score to respond to the speech utterance. In the example of FIG. 1, the speech processing service 110 may determine that the speech interface device 108A is the device to respond to the command in the speech utterance 106 to turn off the alarm.

In some examples, the speech system 122 may use the textual data to identify words in the speech utterance 106 which may indicate which speech interface device 108 is to respond to the speech utterance 106. Based on the analysis of the textual data, weighting factors may be applied to the confidence scores to more heavily, or more lightly, weight the confidence scores. For instance, if the textual data indicates that the speech utterance includes certain verbs or nouns, such as "turn off the alarm," then the arbitration component may know that the word "alarm" corresponds to the device state of the speech interface device 108A which is outputting the alarm sound. Similar to the first and second arbitration stages 128 and 134, the arbitration component determines whether the weighted confidence scores are higher than a threshold score, and if one of the confidence scores is higher, the corresponding speech interface device 108 is selected to respond to the speech utterance 106.

In some examples, the final determination of which speech interface device 108 is to respond to the speech utterance 106 may be made by a command processor 144. The command processor 144 may be provided with various data, such as the audio signals 114A and 114B, the metadata 116A and 116B, text data determined at ASR 130, an intent and/or domain determined at NLU 136, and the various confidence scores determined at arbitration stages 128, 134, and/or 140. For example, the command processor 144 may be provided with the text data determined at ASR stage 130, and provided with the intent determined at the NLU stage 136, and make a final determination as to which speech interface device 108 is to respond to the speech utterance 106. The command processor 144 may include one or more domain speechlets which determine a response for the processed speech utterance 106, and the command processor 144 may determine which of the speech interface devices 108 is to respond to the speech utterance 106. In some examples, the command processor 144 may route identified intents to the appropriate speechlets based on the intent determined using NLU stage 136. For example, the speechlets may be specialized domains and/or devices for responding based on various intents, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), and other types of domains. The NLU stage 136 output may include a command to play music (play music intent), the command processor 144 may route the intent to a music domain speechlet configured to execute a music playing command. Additionally, the command processor 144 may be configured with components to make the final determination as to which of the speech interface devices 108 is to respond to the speech utterance 106. For example, if the NLU stage 136 output indicates that the speech utterance 106 is a request to hang up a call being via a speech interface device 108A, the command processor 144 may route the intent to a smart home speechlet which controls connected smart devices (such as the phone), and cause the speechlet domain to generate hang up command. Further, the command processor 144 may analyze the context to determine which of the speech interface devices 108 is to execute the command. For instance, if the device states of speech interface device 108A is conducting a phone call, and the other speech interface device 108B is idle, then the command processor 144 may determine that the command to hang up the phone call is intended for the speech interface device 108A conducting the phone call. In this way, a command processor 144 may use context data to make a final decision using a determined intent and/or text data to identify which speech interface device 108A is to respond to the speech utterance.

In some examples, the command processor 144 may provide an indication of the speech interface device 108A that is to respond to the speech utterance 106 to a respond dispatched stage 142. The response dispatched stage 142 may issue a response 146 determined by the command processor 144 to the speech interface device 108A.

In some examples, the pipeline instances 126 may include a response dispatched stage 142 where a response 146 is determined (e.g., received from the command processor 144), and sent to the speech interface device 108A to cause the speech interface device 108A to turn off the alarm, hang up the phone, etc. In this way, the speech interface device 108 best suited to reply to the speech utterance 106 may be selected. Rather than simply looking at audio signal amplitudes or signal-to-noise ratios in the audio signals 114A and 114B, additional contextual information is used to determine the appropriate speech interface device 108. As shown in FIG. 1, the user 104 is speaking the speech utterance 106 in the direction of the speech interface device 108B. Under traditional methods, the speech interface device 108B may be selected to respond to the speech utterance 106 as the audio signal 114B would likely have a better signal-to-noise ratio and signal amplitude than the audio signal 114A. However, using the additional contextual information, the speech interface device 108A is selected, which is the device best suited to perform the response 146 to the speech utterance 106.

The actions described herein are performed with respect to two speech interface devices 108 in the environment 102. However, any number of speech interface devices 108 may be used and handled in the same manner, where the pipeline instances 126 are scalable to account for additional speech interface devices 108. In some examples, the speech interface devices 108 need not detect the speech utterance at all, but still be selected to perform the response 146. For instance, a remote speech interface device 108 may be located in another room from the user 104 and not detect the speech utterance 106. The remote speech interface device 108 may be, for example, outputting an alarm sound, or conducting a phone call. While the user 104 is not in the same room as the remote speech interface device 108, the user 104 may instruct another of the speech interface devices 108 to turn off the alarm, or hang up the phone call. The remote speech interface device 108 may still send respective metadata 116 to the remote speech processing service 110, which goes through arbitration in a respective pipeline instance 126. Based on the ASL, NLU, or other analysis of audio signals 114 and analysis of the metadata 116 received from the remote speech interface device 108, the remote speech interface device 108 may still be selected to perform the response 146 despite not detecting the speech utterance 106 and transmitting an audio signal 114.

Figure 2:
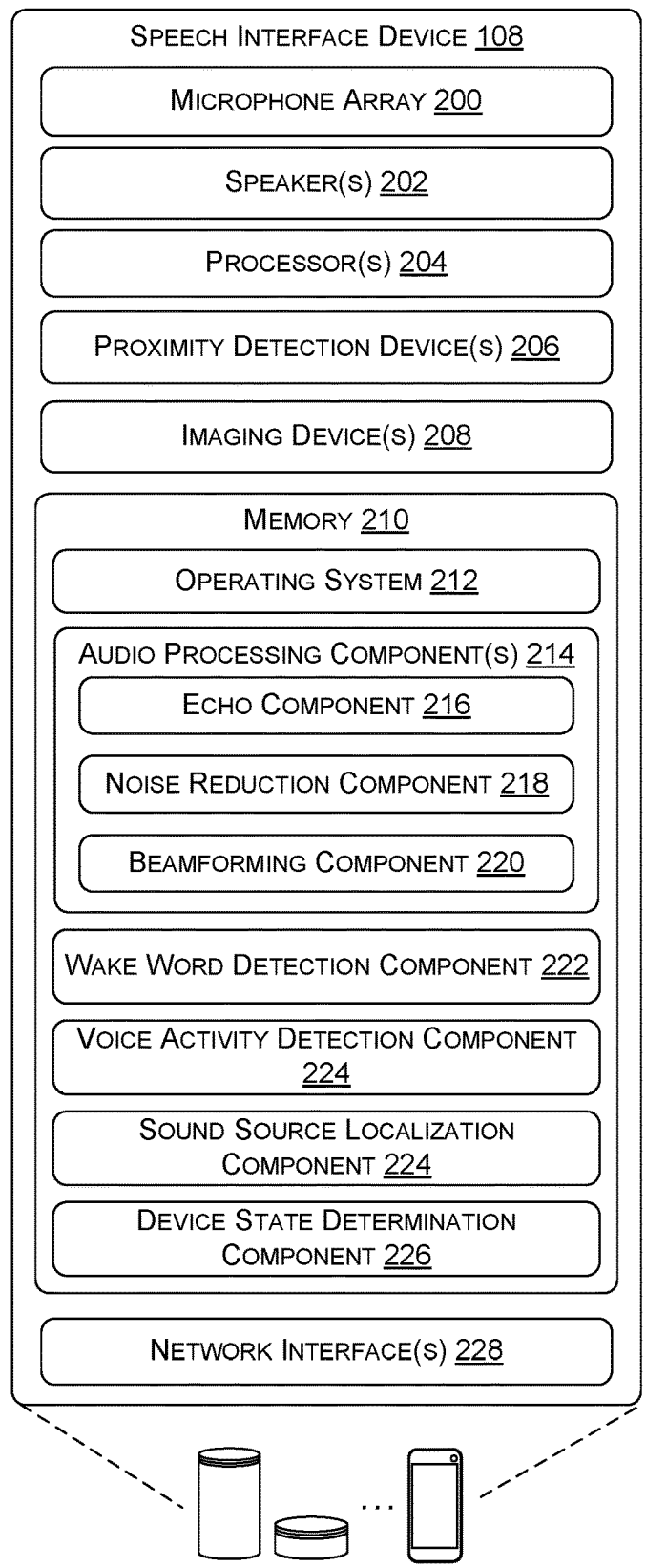
FIG. 2 illustrates a block diagram of an example architecture of a speech interface device that generates an audio signal and metadata, and sends the audio signal and metadata to a remote speech processing service.

FIG. 2 illustrates block diagram of an example architecture of a speech interface device, such as speech interface device 108 of FIG. 1, that generates an audio signal and metadata, and sends the audio signal and metadata to a remote speech processing service.

The speech interface device includes a microphone array 200 and one or more audio speakers 202 that facilitate interactions, such as dialogue, with user 104. The microphone array 200 produces audio signals representing sound from the environment of the speech interface device 108, such speech utterances 106 by the user 104. The audio signals produced by the microphone array 200 may comprise directional audio signals or may be used to produce directional audio signals, where each of the directional audio signals emphasizes audio from a different radial direction relative to the microphone array 200.

Although the speech interface device 108 is described as having one or more integral speakers 202, in other embodiments the speech interface device 108 may not include speakers 202. For example, the speech interface device 108 may comprise a microphone device into which a user speaks to issue commands or may comprise a device for connection to another appliance such as a television. Instead of integrated speakers 202, embodiments such as this may use loudspeaker capabilities of other devices, including other speech interface devices that do have loudspeakers and different types of dedicated loudspeaker components. As one example, the speech interface device 108 may produce an audio output signal that drives an external loudspeaker. As another example, the speech interface device 108 may drive or control an external loudspeaker through a wireless data connection such as a Bluetooth connection. In other situations, the speech interface device 108 may be used in conjunction with a loudspeaker device that receives audio signals and other instructions from the remote speech processing service 110, rather than from the speech interface device 108. In this case, the response 146 of FIG. 1 may be provided to such as loudspeaker device rather than to the speech interface device 108.

The speech interface device 108 may comprise one or more processors 204 coupled to the components of the speech interface device 108 to cause the speech interface device 108 to perform various actions or operations. In some examples, the speech interface device 108 may include one or more proximity detection devices 206, such as a camera, a ranging device, or other sensor that is used to determine the portion of the user 104 relative to the speech interface device 108, and generate corresponding proximity or distance data. Again, proximity or distance data produced in this manner may be used as metadata 116 for purposes of arbitration.

The speech interface device 108 may also include imaging devices 208 which take images of the environment 102 of the user 104. For instance, upon detecting a wakeword or other wake event, the speech interface device 108 may collect image data using the imaging devices 208. The imaging devices may include a camera, thermal imaging device, or any other type of imaging device 208 to capture images of the environment 102. The imaging devices 208 may generate image data, which in turn may be used as metadata 116 for purposes of arbitration.

The speech interface device 108 may include memory 210. The memory 210 may be used to store any number of software components that are executable by the processors 204. Software components stored in the memory 210 may include an operating system 212 that is configured to manage hardware and services within and coupled to the speech interface device 108. In addition, executable components stored by the memory 210 may include audio processing components 214 configured to produce an audio signal using the microphone array 200. The audio processing components 214 may include functionality for processing microphone audio signals generated by the microphone array 200 and/or output audio signals provided to the speakers 202. As an example, the audio processing components 214 may include an acoustic echo cancellation or suppression component 216 for reducing acoustic echo generated by acoustic coupling between the microphone array 200 and the speaker 202. The audio processing components 214 may also include a noise reduction component 218 for reducing noise in received audio signals, such as elements of microphone audio signals other than user speech.

The audio processing components 214 may include one or more audio beamformers or beamforming components 220 configured to generate directional audio signals that are focused in different directions. More specifically, the beamforming components 220 may be responsive to audio signals from spatially separated microphone elements of the microphone array 200 to produce directional audio signals that emphasize sounds originating from different areas of the environment of the speech interface device 108 or from different directions relative to the speech interface device 108. The beamforming components 220 may in some cases produce metadata 116 that may be used in arbitration. For example, the beamforming components 220 may indicate a signal strength of voice activity level corresponding to each directional audio signal.

Executable components stored in the memory 210 and executed by the processors 204 may include a wake word detection component 222 that monitors one or more of the directional audio signals to detect user utterances of the system of the trigger expression. As described above, wake-word detection may be implemented using keyword spotting technology, as an example. The wake word detection component 222 may produce metadata 116 such as a confidence score or level, corresponding to the confidence with which the wake word was detected.

The software components may also include a voice activity detection component 224 configured to monitor levels of voice presence in the directional audio signals produced by the beamforming component 220. Levels of voice presence may be used as metadata for purposes of arbitration.

Software components of the speech interface device 108 may also include a sound source localization (SSL) component 224 that may be used to determine the distance of the user 104 from the speech interface device 108. The SSL component 224 is configured to analyze differences in arrival times of received sound at the respective microphones of the microphone array 200 in order to determine the position from which the received sound originated. For example, the SSL component 224 may use time-difference-of-arrival (TDOA) techniques to determine the position or direction of a sound source. The determined position may be used as metadata for purpose of performing arbitration as discussed above.

The speech interface device 108 also has various hardware components, not shown, such as communication components, power components, I/O components, signal processing components indicators, control buttons, amplifiers, etc.

The speech interface device 102 may have one or more network interfaces 228 such as a wireless or Wi-Fi network communications interface, an Ethernet communications interface, a cellular network communications interface, a Bluetooth communications interface, etc., for communications with the remote speech processing service 110 over various types of networks 120, including wide-area network, local-area networks, private networks, public networks etc. In the case of a wireless communications interfaces, such interfaces may include radio transceivers and associated control circuits and logic for implementing appropriate communication protocols.

Figure 3:
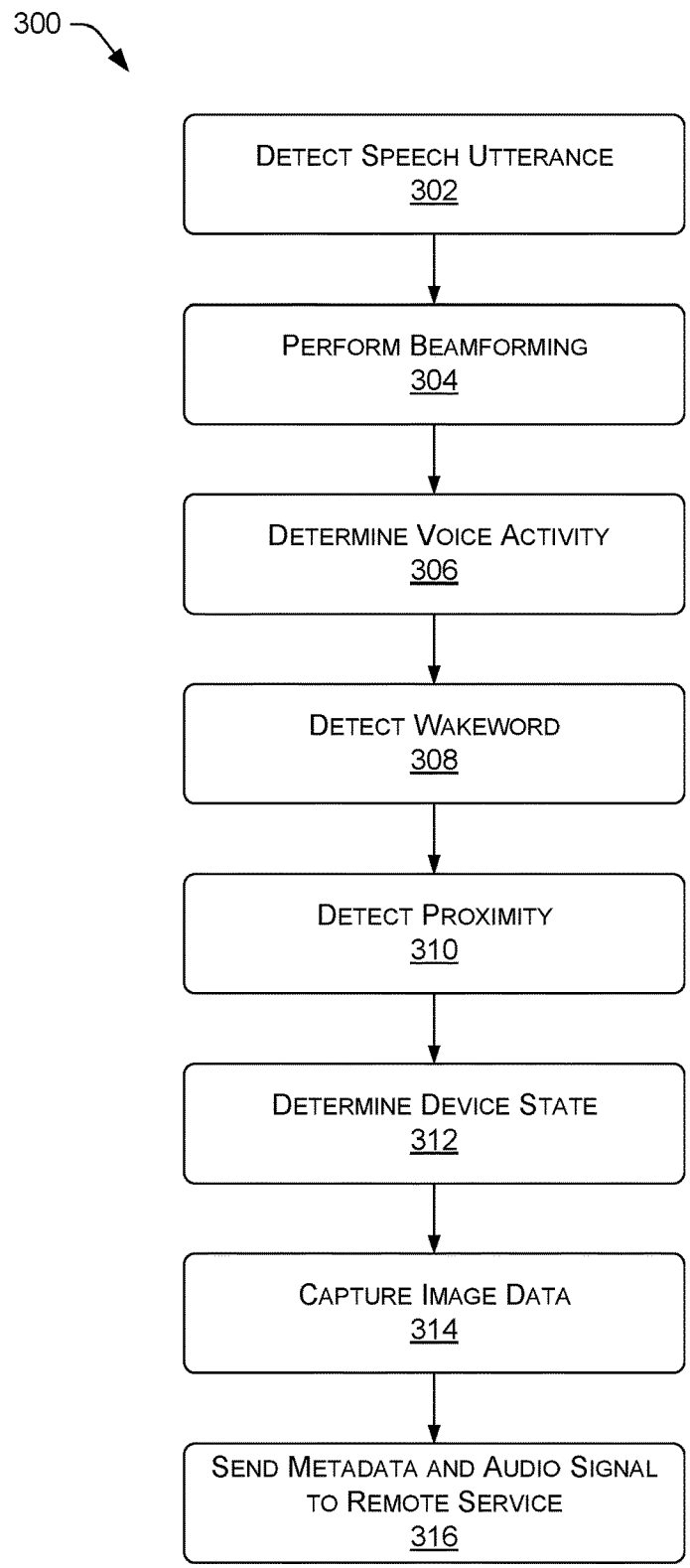
FIG. 3 illustrates a flow diagram of an example method for providing, by a speech interface device, an audio signal and metadata to a remote speech processing service.

FIG. 3 illustrates a flow diagram of an example method 300 for providing, by a speech interface device 108, an audio signal 114 and metadata 116 to a remote speech processing service 110. At 302, the speech interface device 108 may detect sound including a speech utterance, such as speech utterance 106, using the microphone array 200.

At 304, the speech interface device may perform beamforming using the beamforming component 220. The beamforming may comprise audio beamforming to produce multiple directional audio signals, where each directional audio signal emphasizes sound coming from a different direction relative to the speech interface device 108. The speech interface device 108 may perform beamforming 304 using time-difference-of-arrival (TDOA) techniques, such using pairs of microphones 200 and delaying the signal from one of the microphones 200 by an amount that is equal to the time for sound to travel the distance between the microphones 200, thereby emphasizing sound sources that are aligned with the two microphones. Different pairs of microphones 200 can be used in this manner to obtain multiple audio signals, each of which correspond to a different direction.

At 306, the speech interface device may determine voice activity using voice activity detection (VAD) to detect the presence of voice in the directional audio signals. Upon detecting voice presence in one of the directional audio signals, subsequent actions are performed with respect to that directional audio signal. In some embodiments, the subsequent actions of FIG. 3 are performed with respect to the directional audio signal having the highest voice presence.

VAD determines the level of voice presence in an audio signal by analyzing a portion of the audio signal to evaluate features of the audio signal such as signal energy and frequency distribution. The features are quantified and compared to reference features corresponding to reference signals that are known to contain human speech. The comparison produces a score corresponding to the degree of similarity between the features of the audio signal and the reference features. The score is used as an indication of the detected or likely level of speech presence in the audio signal.

At 308, the speech interface device 108 may detect a wakeword by performing wakeword detection on the directional audio signal within which voice activity has been detected or on the directional audio signal within which the highest level of voice activity has been detected. As mentioned above, a predefined word, expression, or other sound can be used as a signal that the user intends subsequent speech to be received and acted upon by the speech interface device 108.

In the described embodiment, the wakeword detection may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In some cases, a keyword spotter may use simplified ASR (automatic speech recognition) techniques. For example, wakeword detection may use a Hidden Markov Model (HMM) recognizer that performs acoustic modeling of an audio signals and compares the HMM model to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models.

The wakeword detection may also use a support vector machine (SVM) classifier that receives the one or more feature scores produced by the HMM recognizer. The SVM classifier produces a confidence score indicating the likelihood that an audio signal contains the trigger expression.

At 310, the speech interface device 108 may detect proximity or distance of a user 104 to the speech interface device 108 using proximity detection. Proximity detection may be implemented using sound source localization (SSL) techniques in conjunction with a two-dimensional microphone array, as an example. Such SSL techniques analyze differences in arrival times of received sound at the respective microphones of a microphone array in order to determine the position from which the received sound originated. Alternatively, the speech interface device 108 may have cameras or specialized sensors for determining the position of a user 104 relative to the speech interface device 108.

At 312, the device state determination component 226 may determine a device state of the speech interface device 108. The device state, or snapshot, may be used as metadata 116 for arbitration.

At 314, the imaging devices 208 may be used to capture image data of the environment 102 of the user 104. In some instances, the imaging devices 208 may be configured to capture image data in a direction from which the sound came from the user 104.

Any of the actions of the method 300 may produce items of the metadata 116. For example, the VAD 306 may produce a voice presence level, indicating the likelihood a person is speaking in the vicinity of the speech interface device 108. The VAD 306 may also produce a signal-to-noise measurement. The wakeword may produce a wakeword confidence level, corresponding to the likelihood that the user 104 has uttered the wakeword. The wakeword detection 308 may also produce a timestamp indicating the time at which the wakeword was detected. The proximity detection 310 may produce a distance parameter, indicating distance of the user 104 from the speech interface device 108.

At 316, the speech interface device 108 may send, via the network interfaces 228, the audio signal 114 and the metadata 116 to the remote speech processing service 110. The audio signal 114 may comprise one of the directional audio signals, such as the directional audio signal in which speech was detected and in which the wakeword was detected.

In some examples, the metadata sent to the remote speech processing service 110 may include information generated based on the sensor data, or the sensor data itself. For instance, the components of the speech interface device 108 may perform processing on sensor data collected by the various sensors (e.g., proximity detection device(s) 206, imaging device(s) 208, etc.) to generate the metadata at 316. For example, the audio processing components(s) 214 may perform various processing on audio signals generated by the microphone array 200, such as noise reduction or beamforming. In other examples, the metadata may simply include sensor data collected by the sensors without any processing performed thereon.

Figure 4A:
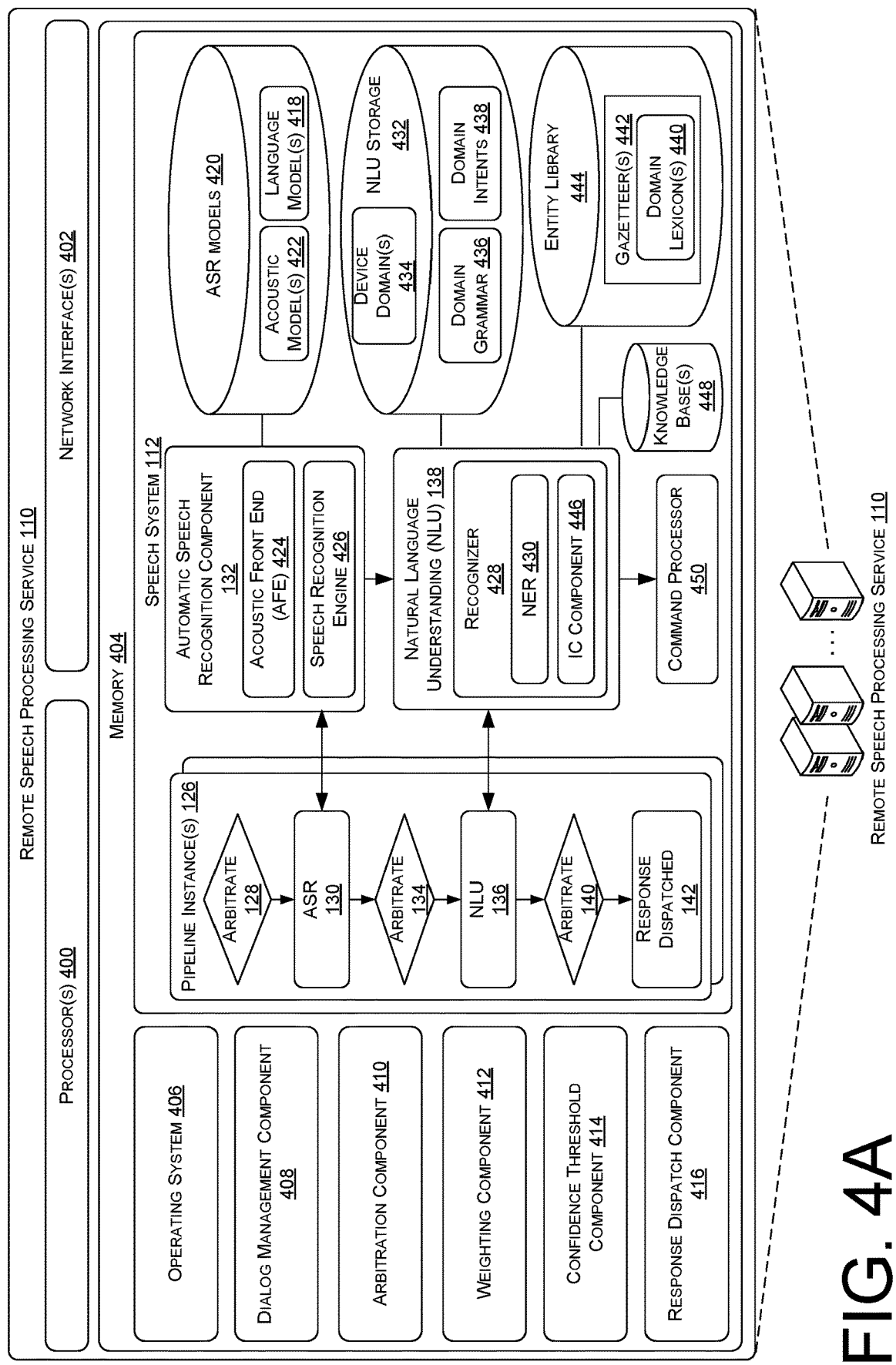
FIG. 4A illustrates a block diagram of an example architecture of a remote speech processing service which receives audio signals and metadata from speech interface devices, and performs arbitration to determine which of the speech interface devices is to respond to a speech utterance of a user represented in the audio signal.

FIG. 4A illustrates a block diagram of an example architecture of a remote speech processing service 110 which receives audio signals 114 and metadata 116 from speech interface devices 108, and performs arbitration to determine which of the speech interface devices is to respond to a speech utterance 106 of a user 104 represented in the audio signals 114.

In various examples, the remote speech processing service 110 may include one or more processors 400 to power components, devices, and actions of the remote speech processing service 110, and one or more network interfaces 402 such as a wireless or Wi-Fi network communications interface, an Ethernet communications interface, a cellular network communications interface, a Bluetooth communications interface, etc., for communications by the remote speech processing service 110 over various types of networks 120, including wide-area network, local-area networks, private networks, public networks etc. In the case of a wireless communications interfaces, such interfaces may include radio transceivers and associated control circuits and logic for implementing appropriate communication protocols.

The remote speech processing service may further include memory 404 which stores various components, components, or other executable software to perform various arbitration actions to determine which speech interface device is to respond to a command in the speech utterance 106. The memory may store an operating system 406 that is configured to manage hardware and services within and coupled to the remote speech processing service 110.

The memory 404 may further store a dialog management component 408 that is responsible for conducting speech dialogs with the user 104 in response to meanings or intents of user speech determined by the NLU component 138. The dialog management component 408 may include domain logic that is used to analyze the meaning of user speech and to determine how to respond to the user speech. The dialog management component 408 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The memory 404 may further include an arbitration component 410, a weighting component 412, and a confidence threshold component 414 for performing various operations in the device arbitration process described herein. For instance, the arbitration component 410, weighting component 412, and confidence threshold component 414 may perform the various stages of the pipeline instances 126 of the speech system 112 as described in FIG. 1. In some examples, the arbitration component 410 may facilitate and/or coordinate the operations of the pipeline instances 126, such as coordinating/performing the analysis of the metadata 116 and/or audio signals 114 at the different arbitration stages 128, 134, and 140, and determine which speech interface device 108 is to respond to the speech utterance 106. In some examples, the weighting component 412 may apply various weighting factors to confidence scores at each of the different arbitration stages 128, 134, and 140 based on the analysis of the metadata 116 and/or audio signals 114 performed by the arbitration component 410. Further, the confidence threshold component 414 may determine whether the various confidence scores for the speech interface devices 108 are above certain confidence thresholds to make a decision as to which speech interface device 108 is to respond to the speech utterance. Further description of the activities of the arbitration component 410, weighting component 412, and confidence threshold component 414 are described below with respect to FIGS. 5A, 5B, and 5C.

As described above with respect to FIG. 1, the speech system 122 (which is stored in memory 404) of the remote speech processing service 110 may perform device arbitration to determine which of the speech interface devices 108A or 108B is to respond to the speech utterance 106. The speech system 112 may include the one or more pipeline instances 126 which are generated based on the amount of speech interface devices 108 for which device arbitration is required. As noted above, the ASR stage 130 and NLU stage 136 may have portions of the analysis performed by the speech processing system 112.

The speech processing system 112 may further include various components for processing a speech utterance 106, such as automatic speech recognition component 132 and natural language understanding component 138. The various components illustrated may be located on a same or different physical devices. The speech processing system 112 may receive audio signals 114 which requests various actions to be performed, such as audio signal processing at ASR stage 130 and intent determination at NLU stage 136.

In some examples, audio data (e.g., audio signals 114) may be received by the speech processing system 112 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the speech interface device 108 prior to sending. Upon receipt by the speech processing system 112, the ASR component 132 may convert the audio data into text. The ASR transcribes audio data into text data representing the words of the speech contained in the audio data. The text data may then be used by other components for various purposes, such as arbitration, executing system commands, inputting data, etc. A speech utterance 106 in the audio data is input to a processor configured to perform ASR which then interprets the utterance based on the similarity between the utterance and pre-established language models 418 stored in an ASR model knowledge base (ASR Models Storage 420). For example, the ASR process may compare the input audio data with models for sounds (e.g., subword units or phonemes) and sequences of sounds to identify words that match the sequence of sounds spoken in the utterance of the audio data.

The different ways a speech utterance 106 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 422 stored in an ASR Models Storage 420), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 132 outputs the most likely text recognized in the audio data. The ASR component 132 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 424 and a speech recognition engine 426. The acoustic front end (AFE) 424 transforms the audio data from the microphone into data for processing by the speech recognition engine 426. The speech recognition engine 426 compares the speech recognition data with acoustic models 422, language models 418, and other data models and information for recognizing the speech conveyed in the audio data. The AFE 424 may reduce noise in the audio data and divide the digitized audio data into frames representing time intervals for which the AFE 424 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 424 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 426 may process the output from the AFE 424 with reference to information stored in speech/model storage (420). Alternatively, post front-end processed data (such as feature vectors) may be received by the device executing ASR processing from another source besides the internal AFE 424. For example, the speech interface device 108 may process audio data into feature vectors (for example using an on-device AFE 424) and transmit that information to a server across a network for ASR processing. Feature vectors may arrive at the remote speech processing service 110 encoded, in which case they may be decoded prior to processing by the processor executing the speech recognition engine 426.

The speech recognition engine 426 attempts to match received feature vectors to language phonemes and words as known in the stored acoustic models 422 and language models 418. The speech recognition engine 426 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 426 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 426 to other processing components, which may be local to the device performing ASR and/or distributed across the network(s). For example, ASR results in the form of a single textual representation of the speech, an N-best list including multiple hypotheses and respective scores, lattice, etc. may be sent to the remote speech processing service 110, for natural language understanding (NLU) processing, such as conversion of the text into commands for execution, either by the user device, by the remote speech processing service 110, or by another device (such as a server running a specific application like a search engine, etc.).

The NLU component 138 (e.g., server) may include various components, including potentially dedicated processor(s), memory, storage, etc. As shown in FIG. 4A, the NLU component 138 may include a recognizer 428 that includes a named entity recognition (NER) component 430 which is used to identify portions of query text that correspond to a named entity that may be recognizable by the system. A downstream process called named entity resolution links a text portion to a specific entity known to the system. To perform named entity resolution, the system may utilize gazetteer information 442 stored in entity library storage 444. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 138 takes textual input (such as the textual input determined by the ASR component 132) and attempts to make a semantic interpretation of the text. That is, the NLU component 138 determines the meaning behind the text based on the individual words and then implements that meaning. NLU component 138 interprets a text string to derive an intent or a desired action from the user as well as the pertinent pieces of information in the text that allow a device (e.g., speech interface device 108) to complete that action. For example, if a spoken utterance is processed using ASR component 132 and outputs the text "turn off the alarm" the NLU component 138 may determine that the user 104 intended that the speech interface device 108A be instructed to turn off an alarm sound being output. As another example, if the spoken utterance is processed using ASR component 132 and outputs the text "hang up the phone" the NLU component 138 may determine that the user 104 intended that the speech interface device 108A be instructed to hang up a phone through which a phone call is being performed.

The NLU component 138 may process several textual inputs related to the same utterance. For example, if the ASR component 132 outputs N text segments (as part of an N-best list), the NLU component 138 may process all N outputs to obtain NLU results.

To correctly perform NLU processing of speech input, the NLU component 138 may be configured to determine a "domain" of the utterance so as to determine and narrow down which services offered by the endpoint device (e.g., remote speech processing service 110 or the speech interface device 108) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 430 receives a query in the form of ASR results and attempts to identify relevant grammars and lexical information that may be used to construe meaning. To do so, the NLU component 138 may begin by identifying potential domains that may relate to the received query. The NLU storage 432 includes a database of devices domains 434 which identify domains associated with specific devices. For example, the speech interface device 108A may be associated with domains for music, telephony, calendaring, contact lists, and device-specific communications, but not video. In addition, the device domains 434 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 428, language model and/or grammar databases 436, a particular set of domain intents/actions 438, and a particular personalized domain lexicon 440. Each gazetteer 442 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 446 parses the query to determine an intent or intents for each identified domain, where the intent corresponds to the action to be performed that is responsive to the query. Each domain is associated with a database (e.g., domain intents 438) of words linked to intents. For example, a music domain intent database 438 may link words and phrases such as "quiet," "volume off," and "mute" to a "mute" intent. A voice-message domain intent database, meanwhile, may link words and phrases such as "send a message," "send a voice message," "send the following," or the like. The IC component 446 identifies potential intents for each identified domain by comparing words in the query to the words and phrases in the domain intents database 438. In some instances, the determination of an intent by the IC component 446 is performed using a set of rules or templates that are processed against the incoming text to identify a matching intent.

In order to generate a particular interpreted response, the NER 430 applies the grammar models and lexical information associated with the respective domain to actually recognize a mention one or more entities in the text of the query. In this manner, the NER component 430 identifies "slots" (i.e., particular words in query text) that may be needed for later command processing. Depending on the complexity of the NER component 430, it may also label each slot with a type of varying levels of specificity (such as noun, place, city, artist name, song name, or the like). Each grammar model 436 includes the names of entities (i.e., nouns) commonly found in speech about the particular domain (i.e., generic terms), whereas the lexical information 440 from the gazetteer 442 is personalized to the user(s) and/or the device. For instance, a grammar model associated with the shopping domain may include a database of words commonly used when people discuss shopping.

The intents identified by the IC component 446 are linked to domain-specific grammar frameworks (included in 436) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (436) framework or frameworks may correspond to sentence structures such as "Send a message to {contact}," "Send a voice message to {contact}," "Send the following to {contact}," etc.

For example, the NER component 430 may parse the query to identify words as subject, object, verb, preposition, etc., based on grammar rules and/or models, prior to recognizing named entities. The identified verb may be used by the IC component 446 to identify intent, which is then used by the NER component 430 to identify frameworks. A framework for the intent of "send a message," meanwhile, may specify a list of slots/fields applicable to play the identified "contact" and any object modifier (e.g., specifying a device of the recipient) or the like. The NER component 430 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 430 may search the database of generic words associated with the domain (in the knowledge base 448). So, for instance, if the query was "send message to Joe," after failing to determine a last name for "Joe," the NER component 430 may search the domain vocabulary for the word "Joe." In the alternative, generic words may be checked before the gazetteer information, or both may be tried, potentially producing two different results.

The output data from the NLU component 138 (which may include tagged text, commands, etc.) may then be sent to a command processor 450 (e.g., command processor 144). The destination command processor 450 may be determined based on the NLU output. For example, if the NLU output includes a command to send a message, the destination command processor 450 may be a message sending application, such as one located on the user device or in a message sending appliance, configured to execute a message sending command. If the NLU output includes a search request, the destination command processor 450 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 138 during runtime operations where NLU operations are performed on text (such as text output from an ASR component 1003). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 428. Each recognizer may include various NLU components such as an NER component 430, IC component 446 and other components such as an entity resolver, or other components.

As noted above, multiple devices may be employed in a single remote speech processing service 110. In such a multi-device system, each of the devices may include different components for performing different aspects of the speech processing. The multiple devices may include overlapping components. The components of the speech interface device 108 and the remote speech processing service 110, as illustrated herein are exemplary, and may be located in a stand-alone device or may be included, in whole or in part, as a component of a larger device or system, may be distributed across a network or multiple devices connected by a network, etc.

Figure 4B:
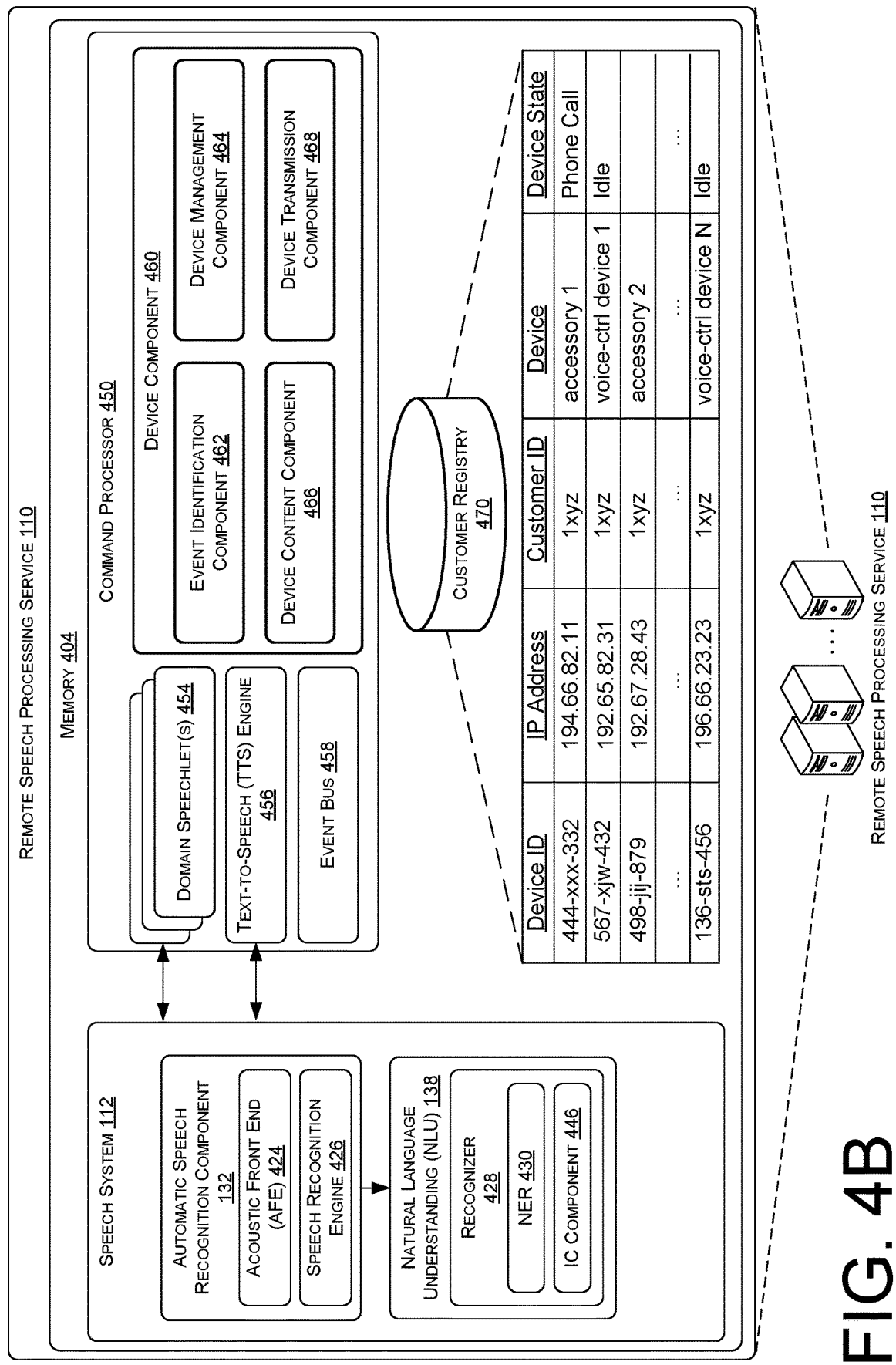
FIG. 4B illustrates a block diagram of an example architecture of a remote speech processing service including a command processor configured to make a decision as to which speech interface device is to respond to a speech utterance of a user.

FIG. 4B illustrates a block diagram of an example architecture of the remote speech processing service 110 including the command processor 450 configured to make a final decision as to which speech interface device 108 is to respond to the speech utterance 106. As illustrated in FIG. 4B, the speech system 112, including the ASR component 132 and the NLU component 138, may be coupled to the command processor 450 and provide the command processor 450 with the text data determined using ASR component 132 and the intent determined using the NLU component 138. As noted above, the NLU component 138 may also determine a domain along with the text by analyzing the text data and, based on this determination, route the request corresponding to the audio data to the appropriate domain speechlet, such as the illustrated domain speechlets 454. Further, the speech system 112 may provide additional data to the command processor 450, such as device identifiers associated with each of the speech interface devices 108A and 108B.

The domain speechlet 454 may comprise any type of device or group of devices (e.g., hardware device, virtual devices or partitions, software executing on one or more devices, code stored in memory of the remote speech processing service and/or memory of the speech interface devices 108, server, etc.), and may receive the text data and/or an intent associated with the audio signals 114A or 114B and determines how to respond to the request. For instance, the intent for a command "please hang up my phone call" may be routed to a smart home domain speechlet 454 which controls devices connected to the speech interface devices 108, such as a phone through which a phone call is being conducted. The smart home domain speechlet 454 may determine a command to generate based on the intent of the user 104 to hang up a phone call. Additionally, the smart home domain speechlet 454 may determine additional content, such as audio data, to be output by one of the speech interface devices 108A or 108B, such as "we have hung up your phone call."

In some examples, the smart home domain speechlet 454 may further make a final determination as to which speech interface device 108 to have perform the requested action in the speech utterance 106. The command processor 450 may have received various information from the pipeline instance(s) 126, such as the metadata, the various confidence scores determined at arbitration stages 128, 134, and/or 140, the text data, the intent and domain, etc. In the example of a phone call, the smart home domain speechlet 454 may determine that the device state of speech interface device 108A is that speech interface device 108A is conducting the phone call (e.g., wirelessly connected to a phone), and that the device state of speech interface device 108B is idle, or not actively performing an action. In such an instance, the smart home domain speechlet 454 may determine that, because the intent of the user 104 is to hang up the phone call, and because the device state of the speech interface device 108A is conducting a phone call, that the speech interface device 108A is the device that should respond to the request in the speech utterance 106. In some examples, the speech interface device 108B may have higher signal-to-noise ratios or other indicia which indicate the user 104 is speaking in the direction of the speech interface device 108B, but the appropriate device to handle the request is speech interface device 108A. In various examples, the smart home domain speechlet 454 may take into account other information as noted above when determining which speech interface device 108 to select to perform the response 146, such as the various confidence scores, and additional context provided in metadata 116A and/or 116B.

Various types of domain speechlets 454 may be used to determine which devices to use to respond to a speech utterance 106, as well as the appropriate response 146 and potential additional content (e.g., audio data). For example, the domain speechlets 454 may include a third party skills domain speechlet 454 which may handle intents associated with gaming, productivity, etc., a music domain speechlet 454 which may handle intents associated with music play requests (e.g., Amazon Music, Pandora, Spotify, iHeart, etc.), a video domain speechlet 454 which may handle intents associated with video play requests (e.g., Amazon Video, HBO, Netflix, Hulu, etc.), a household organization domain speechlet 454 which may handle intents associated with household activities (e.g., calendars, reminders, timers, etc.), a smart home domain speechlet 454 which may handle intents associated with controlling smart devices (e.g., controlling lights, door locks, home monitoring, etc.), an automotive domain speechlet 454, a shopping domain speechlet 454 which may handle shopping requests (e.g., making a shopping list, ordering items online, etc.), and/or a weather domain speechlet 454 which may handle requests for weather forecasts (e.g., providing a URL to a weather website, providing weather related images and/or videos, etc.).

After the domain speechlet 454 (i) determines which speech interface device 108 is to respond to the request in the speech utterance 106, (ii) generates the appropriate command based on the intent of the user 104, and/or (iii) provides additional content, such as audio data, to be output by one of the speech interface devices 108A or 108B (e.g., "we have hung up your phone call"), the domain speechlet 454 may provide this information back to the speech system 112, which in turns provides some or all of this information to a text-to-speech (TTS) engine 456. The TTS engine 456 then generates an actual audio file for outputting the second audio data determined by the domain speechlet 454 (e.g., "we have hung up your phone call", or "we have turned off your alarm . . . "). After generating the file (or "audio data"), the TTS engine 456 may provide this data back to the speech system 112.

The speech system 112 may then publish (i.e., write) some or all of this information to an event bus 458. That is, the speech system 112 may provide information regarding the initial request (e.g., the speech, the text, the domain/intent, etc.), the response to be provided to the speech interface device 108 (e.g., the command to hang up a phone call, the command to turn off an alarm, etc.), or any other information pertinent to the interaction between the speech interface device 108A and the remote speech processing service 110 to the event bus 458.

Within the remote speech processing service 110, one or more components or services may subscribe to the event bus 458 so as to receive information regarding interactions between user devices and the remote speech processing service 110. In the illustrated example, for instance, the device component 460 may subscribe to the event bus 458 and, thus, may monitor information regarding these interactions. As illustrated, the device component 460 includes an event-identification component 462, a device-management component 464, a device-content component 466, and a device-transmission component 468.

The event-identification component 462 functions to monitor information published to the event bus 458 and identify events that may trigger action by the device component 460. For instance, the event-identification component 462 may identify (e.g., via filtering) those events that: (i) come from speech interface devices 108 that are associated with secondary device(s) (e.g., have secondary devices in their environments such as televisions, personal computing devices, etc.), and (ii) are associated with supplemental content (e.g., image data, video data, etc.). The device management component 464 may reference the customer registry 470 to determine which speech interface devices 108 are associated with secondary devices, as well as determine device types, states, and other capabilities of these secondary devices. For instance, the device management component 464 may determine, from the information published to the event bus 458, an identifier associated with the speech interface device 108 making the corresponding request or the speech interface device 108 selected to respond to the speech utterance 106. The device management component 464 may use this identifier to identify, from the customer registry 470, a user account associated with the speech interface device 108. The device management component 464 may also determine whether any secondary devices have been registered with the identified user account, as well as capabilities of any such accessory devices, such as how the accessory devices are configured to communicate (e.g., via WiFi, short-range wireless connections, etc.), the type of content the devices are able to output (e.g., audio, video, still images, flashing lights, etc.), and the like.

The device content component 466 may determine whether a particular event identified by the event-identification component 462 is associated with supplemental content. That is, the device content component 466 may write, to a datastore, indications of which types of events and/or which primary content or responses are associated with supplemental content. In some instances, the remote system 112 may provide access to third-party developers to allow the developers to register supplemental content for output on accessory devices for particular events and/or primary content. For example, if a speech interface device 108 is to output that the weather will include thunder and lightning, the device content component 466 may store an indication of supplemental content such as thunder sounds, pictures/animations of lightning and the like. In another example, if a speech interface device 108 is outputting information about a particular fact (e.g., "a blue whale is the largest mammal on earth . . . "), then a secondary device, such as television, may be configured to provide supplemental content such as a video or picture of a blue whale. In these and other examples, the device content component 466 may store an association between the primary response or content (e.g., outputting of information regarding the world's largest mammal) and corresponding supplemental content (e.g., the audio data, image data, or the like). In some instances, the device content component 466 can also indicate which types of secondary devices are to output which supplemental content. For instance, in the instant example, the device content component 466 may store an indication that secondary devices of a class type "tablet" are to output a picture of a blue whale. In these and other instances, meanwhile, the device content component 466 may store the supplemental content in association with secondary-device capabilities (e.g., devices with speakers output the audio commentary, devices with screens output the image, etc.).

Finally, the device transmission component 468 determines how to transmit response and/or supplement content (and/or information acquiring the content) to the speech interface devices 108 and/or the secondary devices. To make this determination, the device transmission component 468 may determine a device type of the speech interface devices 108 and/or secondary devices, capabilities of the device(s), or the like, potentially as stored in the customer registry 470. In some instances, the device transmission component 468 may determine that a particular device is able to communicate directly with the remote speech processing service 110 (e.g., over WiFi) and, thus, the device transmission component 468 may provide the response and/or content directly over a network to the accessory device (potentially via the speech system 112). In another example, the device transmission component 468 may determine that a particular secondary device is unable to communicate directly with the remote speech processing service 110, but instead is configured to communicate with a speech interface device 108 in its environment over short-range wireless networks. As such, the device transmission component 468 may provide the supplement content (or information) to the speech system 112, which in turn may send this to the speech interface device 108, which may send the information over a short-range network to the secondary device.

The memory 404 may further include the customer registry 470 that includes data regarding user profiles as described herein. The customer registry 470 may be located part of, or proximate to, the remote speech processing service 110, or may otherwise be in communication with various components, for example over the network 120. The customer registry 470 may include a variety of information related to individual users, accounts, etc. that interact with the speech interface devices 108, and the remote speech processing service 110. For illustration, the customer registry 470 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device.

In some examples, the device state for devices associated with a user account may indicate a current state of the device, such as speech interface devices 108A and 108B. In this way, the command processor 450 and/or the domain speechlets 454 may determine, based on the stored device states in the customer registry 470, a current device state of the speech interface devices 108. Rather than receiving device states for the speech interface devices 108, in metadata 116, the devices states may already have been determined or received and stored in the customer registry. Further, the customer registry may provide indications of various permission levels depending on the user. As an example, the speech system 112 may perform speaker recognition on the audio signals 114 to determine an identity of the speaker. If the speaker is a child for instance, the child profile may have permission restrictions where they are unable to hang up a phone call of a parent, for example.

Conversely, a parent profile may be able to hang up a phone call involving a child profile, or change channel on a television when a child profile is also detected as watching the television.

A particular user profile may include a variety of data that may be used by the service 110. For example, a user profile may include information about what speech interface device 108 are associated with the user 104. The user profile may further indicate an IP address for each of the devices associated with the user 104, customer IDs for each of the devices, indicates of the types of devices, and current device states for the devices.

As used herein, a processor, such as processor(s) 204 and/or 400, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 204 and/or 400 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 204 and/or 400 may possess its own local memory, which also may store program components, program data, and/or one or more operating systems.

As described herein, memory 210 and/or 404 may include volatile and nonvolatile memory, removable and non-removable media implemented in any method or technology for storage of information, such as computer-readable instructions, data structures, program component, or other data. Such memory 210 and/or 404 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 210 and/or 404 may be implemented as computer-readable storage media ("CRSM"), which may be any available physical media accessible by the processor(s) 204 and/or 400 to execute instructions stored on the memory 210 and/or 404. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 210 and/or 404, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Each of the network interface(s) 228 and network interface(s) 402 may enable communications between the speech interface devices 108 and the remote speech processing service 110, as well as other networked devices. Such network interface(s) can include one or more network interface controllers (NICs) or other types of transceiver devices to send and receive communications over a network.

For instance, each of the net network interface(s) 228 and network interface(s) 402 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 228 and network interface(s) 402 may include a wide area network (WAN) component to enable communication over a wide area network. The network 120 may represent an array of wired networks, wireless networks, such as WiFi, or combinations thereof.

Figure 5A:
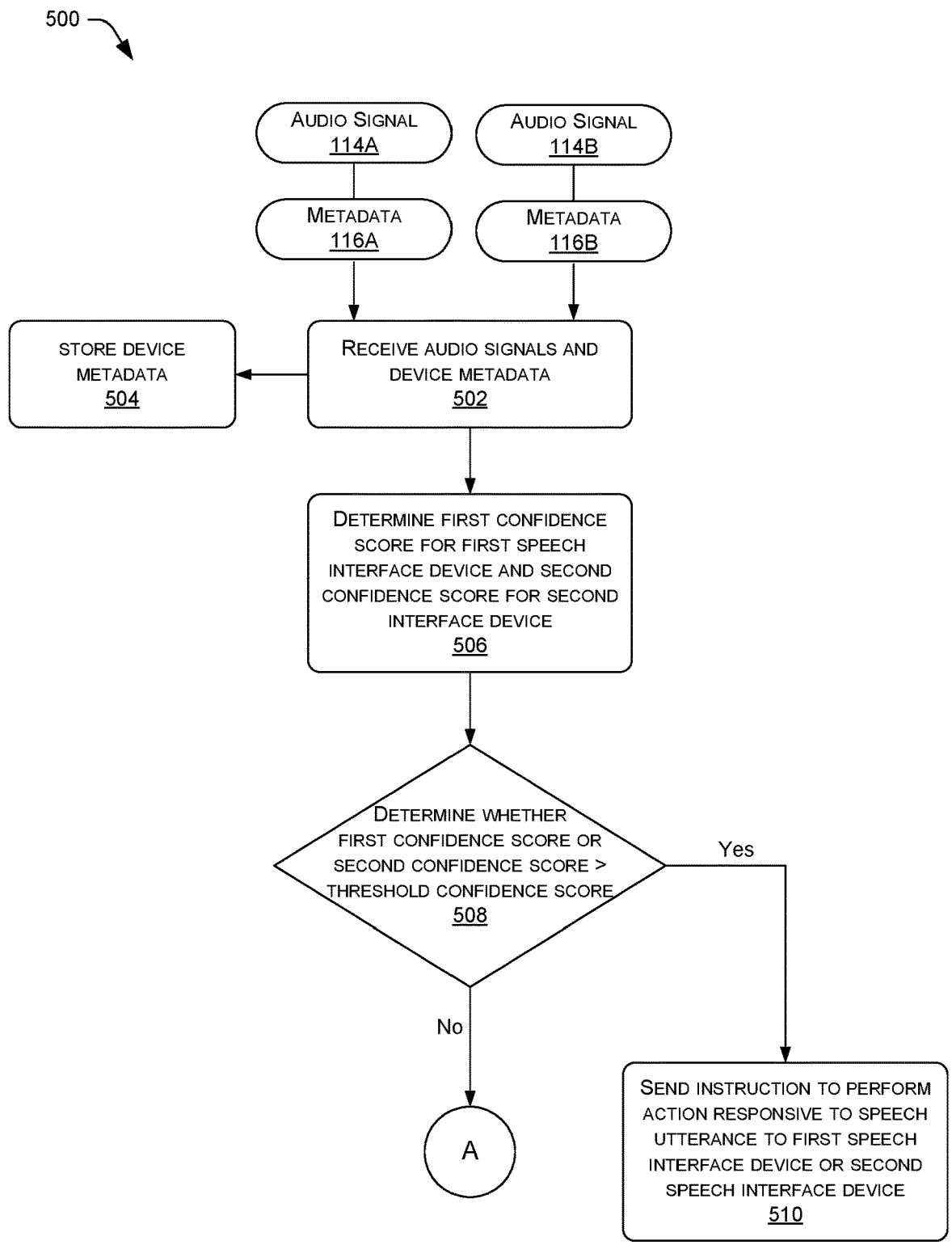
FIGS. 5A, 5B, and 5C illustrate an example flow diagram of an example method for arbitrating, by a remote speech processing service, between multiple speech interface devices to determine which speech interface device is to respond to a speech utterance of a user.
Figure 5B:
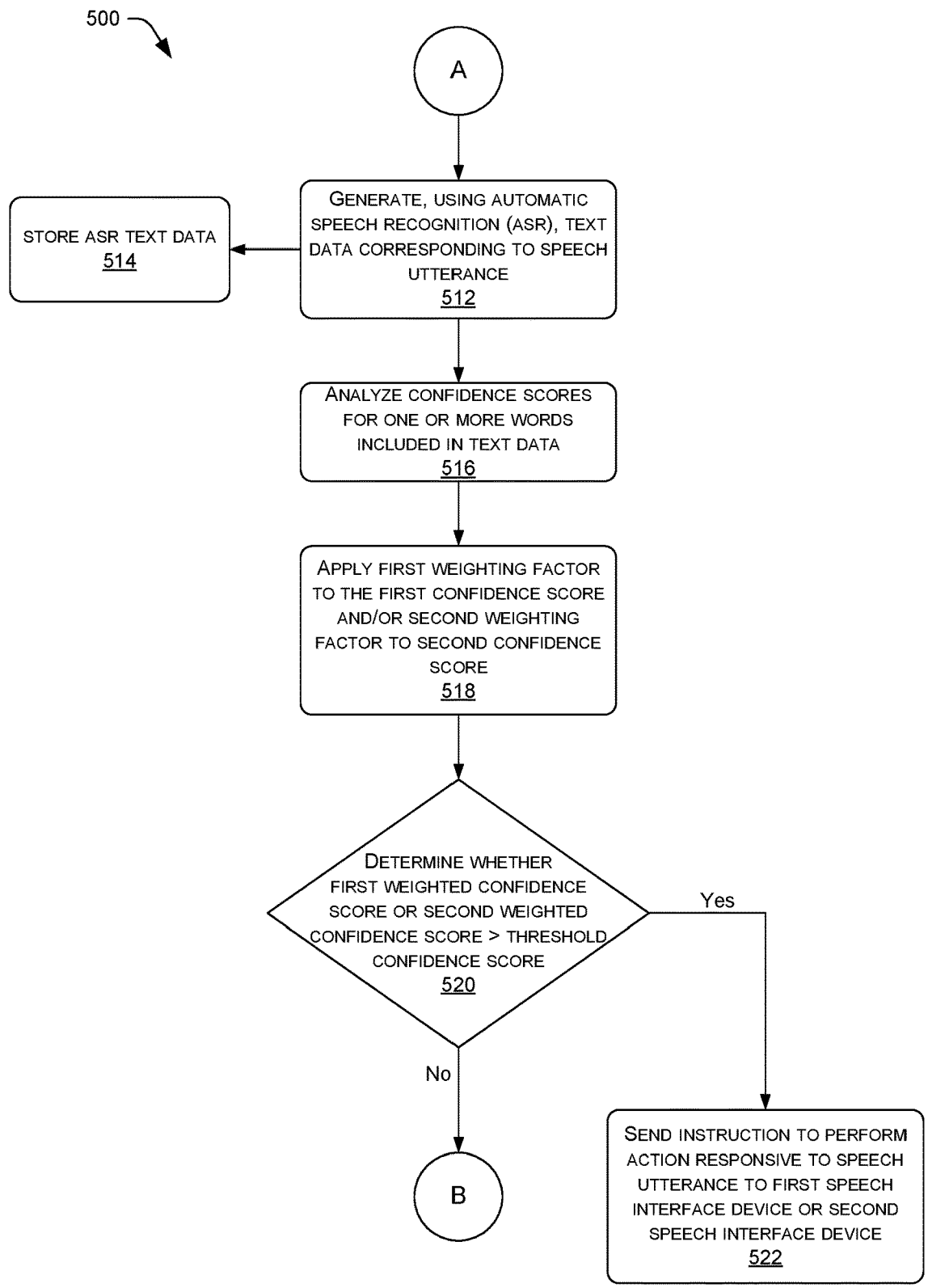
Figure 5C:
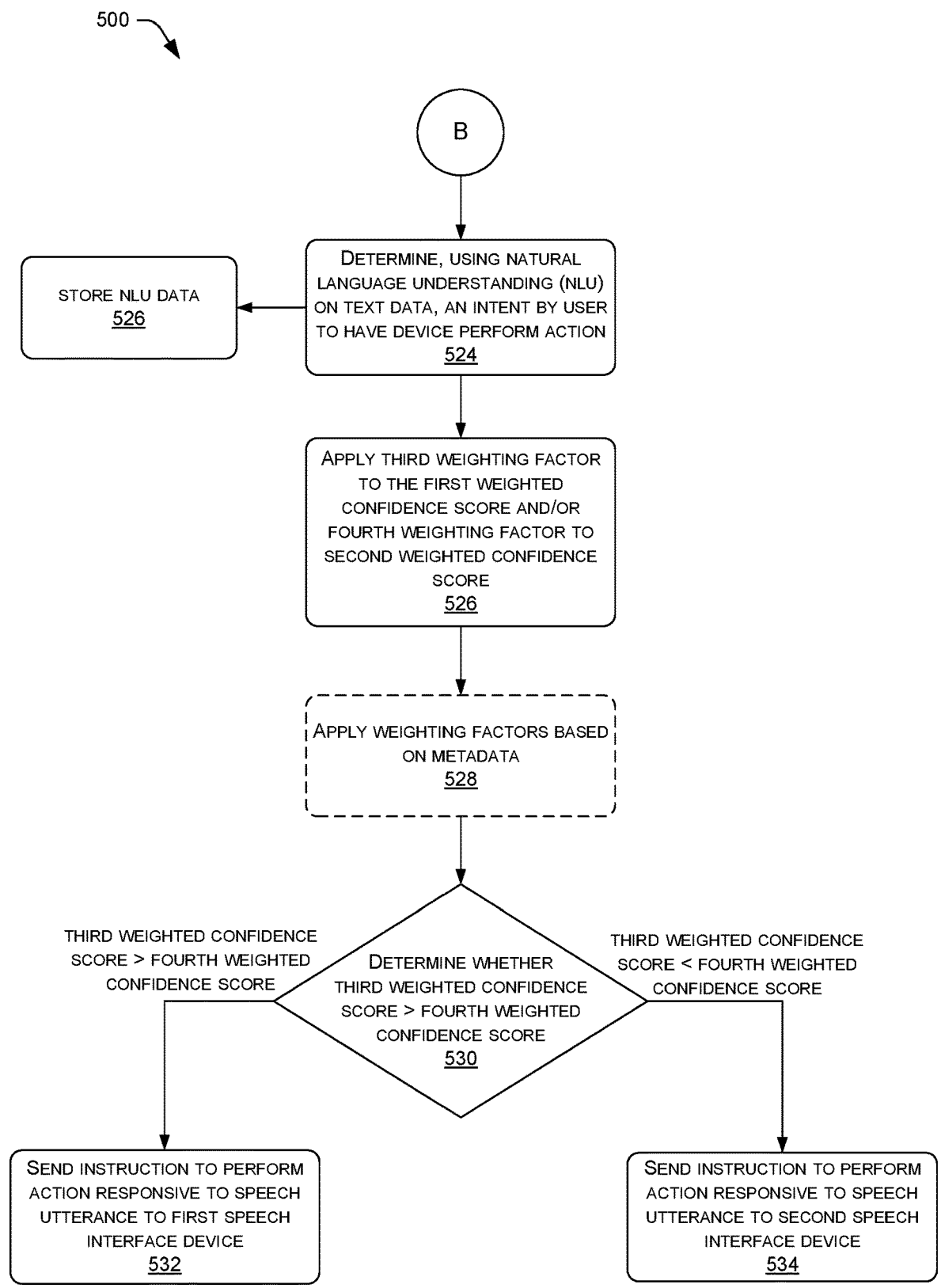

FIGS. 5A, 5B, and 5C illustrate an example flow diagram of an example method 500 for arbitrating, by a remote speech processing service 110, between multiple speech interface devices 108 to determine which speech interface device 108 is to respond to a speech utterance 106 of a user 104. The order in which the operations or steps are described is not intended to be construed as a limitation, and any number of the described operations may be combined in any order and/or in parallel to implement method 500. In some examples, the method 500 may correspond to a pipeline instance 126, and be performed for each of the interface devices 108 which detect the speech utterance 106.

At 502, the remote speech processing service 110 may receive, from the speech interface device 108A, the audio signal 114A and metadata 116A. Further, at 502 the remote speech processing service 110 may receive, from the speech interface device 108B, the audio signal 114B and metadata 116B. At 504, the remote speech processing service 110 may store the device metadata 116A and 116B in memory of the remote speech processing service 110 for later use.

In some examples, the metadata 116A and 116B may comprise various types of data. For instance, the metadata 116A and 116B may each include one or more of the following:

signal-to-noise ratios or measurements for each of the audio signals 114;
an amplitude for each of the audio signals 114;
a level of voice presence for each of the audio signals 114;
proximity measurement data indicating a distance between each of the speech interface devices 108 and the user 104;
image data corresponding to an image of the environment of the user 104;

device state data indicating a device state (e.g., snapshot) for each of the speech interface devices 108;

timestamp data indicating times at which each of the speech interface devices 108 detected the speech utterance;

speaker identification data indicating an identity of the user 104;

device capabilities of the speech interface device 108 (e.g., music streaming, appliance interaction, calendar functionality, etc.); and/or user or household account information for the speech interface devices 108.

At 506, the remote speech processing service 110 may determine a first confidence score for the first speech interface device 108A and a second confidence score for the second speech interface device 108B. In some examples, one or more components of the remote speech processing service 110 may determine the confidence scores, such as the arbitration component 410 or the weighting component 412. For example, the components of the remote speech processing service 110 may analyze the metadata 116A and 116B at 506 and determine whether the confidence scores should be higher, or lower, (e.g., weighted more heavily or lightly) based on the metadata 116A and 116B. Generally, the confidence scores indicate a percentage or likelihood that a particular speech interface device 108 is the most appropriate device to respond to the speech utterance. The confidence scores may be based on various scales (e.g., 1-10, 1-100, etc.) and represented by numerals, percentages, or any other type of representation. The higher the confidence score, the more likely it is that the corresponding speech interface device 108 is best suited to respond to the speech utterance.

For example, a higher signal-to-noise ratio may indicate that a user was closer to a particular speech interface device 108, which may increase the confidence scores. A higher amplitude for the audio signals 114 may indicate that a user yelled at a speech interface device 108, or was facing directly at the speech interface device 108, which may increase a confidence score. The higher the level of voice presence in an audio signal may raise a confidence score. In some examples, the closer the user 104 is to a particular speech interface device 108, which may increase the confidence value for that speech interface value.

In some examples, the remote speech processing service 110 may analyze the image data using various image analysis techniques (e.g., object recognition, facial recognition, etc.) and determine a positon of the user 104 in the environment 102. In some examples, if the remote speech processing service 110 identifies at least a portion of a face of the user 104, this may indicate that the user 104 is facing the corresponding speech interface device 108. If the user 104 is facing a speech interface device 108, this may indicate the user 104 is speaking to that particular device 108 to cause the device to perform an operation, which may increase a confidence score.

In some examples, the remote speech processing service 110 may analyze the device state data to determine device states of the speech interface devices 108. In some examples, the speech interface devices 108 which have some sort of active device state (e.g., streaming music, performing a phone call, setting off an alarm, etc.) may have a higher confidence score than a speech interface device 108 whose device state is idle, or asleep. It is more likely that a user 104 would want a device that has an active device state to perform an operation or action, such as turning off an alarm that is going off.

The remote speech processing service 110 may analyze time stamp data to determine, based on the timestamp data, times at which each speech interface device 108 detected the speech utterance 108, or a wakeword. The remote speech processing service 110 may increase the confidence score of the speech interface device 108 which provides an audio signal 114 with the earlier timestamp. In various examples, other types of metadata collected by speech interface devices 108 may be used or analyzed to determine confidence scores for the respective speech interface devices 108.

At 508, the remote speech processing service 110 may determine whether the first confidence score for the speech interface device 108A of the second confidence score for the speech interface device 108B are greater than a threshold confidence score. In some examples, the threshold confidence score may have been previously determined by the confidence threshold component 414 and correspond to a confidence value at which an acceptably high percentage of "correct," or best suited, speech interface devices 108 are selected to perform a responsive action. If the remote speech processing service 110 determines at 508 that the first confidence value or the second confidence value is greater than, or equal to in some examples, the threshold confidence value, the remote speech processing service 110 may send, at 510, an instruction to perform an action responsive to the speech utterance 106 to the first speech interface device 108A or the speech interface device 108B depending on which confidence score is greater than the threshold confidence score. If neither confidence score is greater than the threshold confidence score, the remote speech processing service 110 may proceed to 512.

At 512, the remote speech processing service 110 may generate, using automatic speech recognition (ASR), text data corresponding to the speech utterance. In some instances, the text data may include one or more words or sequences of words included in the speech utterance 106 of the user 104. At 514, the remote speech processing service 110 may store the ASR text data in memory for later use in the pipeline instance 126. In some examples, the remote speech processing service 110 may further determine confidence scores representing the likelihood that the one or more words match those spoken in the utterance 106. The ASR confidence scores for the audio signals 114A and 114B may be based on a number of factors including, for example, the similarity of the sound in the utterance 106 to models for language sounds (e.g., an acoustic model 422 stored in an ASR Models Storage 420), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 132 outputs the most likely text recognized in the audio data. The ASR component 132 may also output multiple ASR hypotheses in the form of a lattice or an N-best list with each hypothesis corresponding to an ASR confidence score or other score (such as probability scores, etc.).

At 516, the remote speech processing service 110 may analyze the confidence scores associated with one or more words included in the text data generated at 512. For example, at 516 the remote speech processing service 110 may determine that a confidence score representing the likelihood that the one or more words identified using ASR on the audio signal 114A is a higher confidence score than that the confidence score representing the likelihood that the one or more words identified using ASR on the audio signal 114B. In this example, the remote speech processing service 110 may apply a first weighting factor which weights the speech interface device 108A higher (e.g., more likely to be the speech interface device to respond to the speech utterance 108A) than a second weighting factor to weight the speech interface device 108B.

Thus, at 518, the remote speech processing service 110 may apply a first weighting factor to the first confidence score for the speech interface device 108A and a second weighting factor to the second confidence score for the speech interface device 108B. In various examples, the weighting factors may be applied based on the analysis of the confidence scores that the one or more words determined using ASR by the remote speech processing service 110 at 516 for each of the audio signals 114A and 114B.

At 520, the remote speech processing service 110 determines whether the first weighted confidence score or the second weighted confidence score are greater than a threshold confidence score. If the remote speech processing service 110 determines at 520 that one of the first or second weighted confidence scores are greater than the threshold confidence score, the remote speech processing service 110 may proceed to 522 and send an instruction to the corresponding speech interface device 108 to perform an action responsive to the speech utterance 106. The threshold score used at 520 may be the same as, or different than, the threshold score used at 508. If the remote speech processing service 110 determines that the weighted confidences scores are not greater than the threshold confidence score, then the remote speech processing service 110 may proceed to 524.

At 524, the remote speech processing service 110 may determine, using natural language understanding (NLU) on the text data generated at 512 and stored at 514, an intent of the user 104 in the speech utterance 106. For instance, the remote speech processing service 110 may determine at 524 that the user 104 intended to have speech interface device 108A perform an action, such as ending a telephone call, turning off an alarm, performing an Internet search, etc. In some examples, the remote speech processing service 110 may store the NLU data in memory of the remote speech processing service 110 for later use by the pipeline instance 126.

At 526, the remote speech processing service 110 may apply weighting factors to the first weighted confidence score for the speech interface device 108A and the second weighted confidence score for the speech interface device 108B to generate final weighted confidence scores. In some examples, the weighting factors applied at 526 may be determined based on the intent of the user 104 determines by the remote speech processing service 110 at 524.

In some examples, the remote speech processing service 110 may determine an intent of the user 104 by analyzing the one or more words. For instance, the remote speech processing service 110 may identify, from the one or more words, at least one of a device name associated with the first speech interface device, a verb or noun associated with the first device state of a speech interface device 108, or a verb or noun associated with a capability of speech interface device 108. The device name may indicate that the user 104 is attempting to talk to a specific speech interface device 108 which has been previously named with the spoken device name. The verb or noun associated with the devices state of a speech interface device 108 may indicate that the user is attempting to communication with that particular speech interface device 108. For instance, if a speech interface device is conducting a telephone call, and the one or more words include "phone call" or "hang-up," then the one or more words may indicate that the user 104 is attempting to perform an action with the speech interface device 108 that is conducting the phone call.

In some examples, at 528 the remote speech processing service 110 may further apply weighted factors based on the metadata, such as by using techniques similar to those used at 506. For example, the components of the remote speech processing service 110 may analyze the metadata 116A and 116B at 506 and determine whether the confidence scores should be higher, or lower, (e.g., weighted more heavily or lightly) based on the metadata 116A and 116B. The remote speech processing service 110 may use the context provided by the metadata 116A and/or 116B to determine weighted factors to apply to the third weighted confidence score and/or the fourth weighted confidence score. For instance, at 524 the NLU may indicate that an intent of the user 104 is to turn off an alarm, end a phone call, etc. The remote speech processing service 110 may determine, based on the snapshot 118A, that an alarm is going off on speech interface device 108A, or a phone call is occurring, and apply a weighting factor to the third confidence score to weight more heavily the third confidence score. In this way, it is more likely that the speech interface device 108A will be selected to perform the response 146.

At 530, the remote speech processing service 110 may determine whether the third weighted confidence score for the speech interface device 108A is greater than the fourth weighted confidence score for the speech interface device 108B. In this way, the remote speech processing service 110 determines which of speech interface devices 108A or 108B is best suited or more appropriate for responding to the speech utterance 106 of the user 104. If the third weighted confidence score is greater than the fourth weighted confidence score, then the remote speech processing service 110 may proceed to 532 and send an instruction to the first speech interface device 108A to perform the action responsive to the speech utterance 106. Alternatively, if the remote speech processing service 110 determines, at 528, that the fourth weighted confidence score is greater than the third weighted confidence score, then the remote speech processing service 110 may proceed to 534 and send an instruction to the second speech interface device 108B to perform the action responsive to the speech utterance 106. In various examples, the context provide by the metadata may be analyzed at 528 in addition to, or in place of, determining the confidence scores at 506. For instance, the metadata may be used only at 506, only at 528, or at both steps.

In some examples, rather than comparing the third confidence score with the fourth confidence score, the remote speech processing service 110 may determine whether the third confidence score and/or the fourth confidence score are above a threshold confidence score. If the third confidence score is greater than a threshold confidence score and the fourth confidence score is not, the remote speech processing service 110 may proceed to 532. Alternatively, if the fourth confidence score is greater than the threshold confidence score and the third confidence score is not, the remote speech processing service 110 may process to 534.

In various examples, all or some of the steps 502 through 534 may be performed in real time or near real time as a conversation is occurring with the user 104. For example, a conversation may be occurring between one of speech interface devices 108A or 108B and the user, such as with the use of the dialog management component 408. Generally, a conversation between the user and a speech interface device 108 may include one or more "turns" as the user 104 and the speech interface device 108 take turns speaking to each other. Thus, the user 104 may issue multiple speech utterances 106 during the conversation during each of his or her turns. In some examples, the techniques performed herein may be applied for each turn of the user 104 to determine whether or not the speech system 112 has enough confidence to select a speech interface device 108 to respond to the user. In some examples, the speech system 112 may be unable to determine with a high enough confidence which of the speech interface devices 108A or 108B are to respond to an initial speech utterance 106 in the conversation. For instance, the confidence values determined for the speech interface devices 108A and 108B may not be high enough to select one of the devices to respond to the initial speech utterance 106 after a single turn. The speech system 112 may then analyze the speech utterance 106 of a second turn of the user 104 to determine whether the speech interface has a high enough confidence value from the second turn of the speech utterance 106 to determine a device 108 to select. In some examples, the confidence scores determined from each turn may be carried through the entire conversation. For instance, the confidence values determined for a first turn of a user 104 speech utterance 106 may be carried into a second turn. The second speech utterance 106 may be analyzed using the confidence scores determined for the initial turn as starting points. In this way, the speech system 112 may determine, for each turn in a conversation between a speech interface device 108 and a user 104, whether one of the speech interface devices 108 has a high enough confidence score to be selected to perform the response 146.

Figure 6:
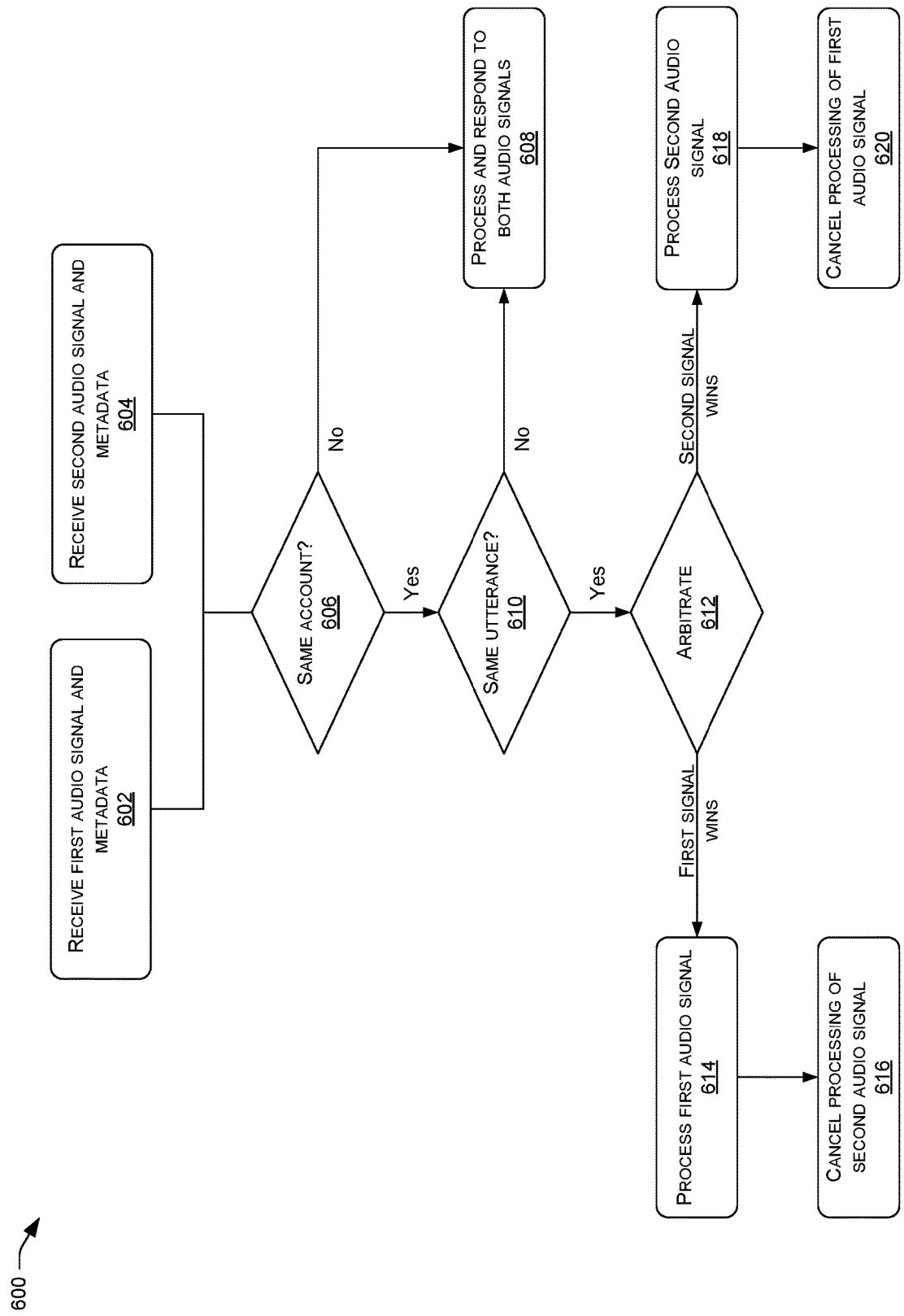
FIG. 6 is an example flow diagram illustrating an example method for processing multiple audio signals from multiple speech interface devices.

FIG. 6 is an example flow diagram illustrating an example method 600 for processing multiple audio signals 114 from multiple speech interface devices 108. The order in which the operations or steps are described is not intended to be construed as a limitation, and any number of the described operations may be combined in any order and/or in parallel to implement method 600. In some examples, the method 600 may be performed at least partially prior to, or at least partially simultaneously with, the method 500. The method 600 may be performed by the remote speech processing service 110.

At 602, the remote speech processing service 110 may receive a first audio signal 114A first metadata 116A from a speech interface device 108A. At 604, the remote speech processing service 110 may receive a second audio signal 114B and second metadata 116B from the speech interface device 108B. The first audio signal 114A and second audio signal 114B may include data representing the speech utterance 106. The first metadata 116A and the second metadata 116B may comprise attributes of the audio signals 114A and 114B, and/or context associated with the speech interface devices 108A and 108B.

At 606, the remote speech processing service 110 may determine whether the speech interface devices 108A and 108B are each associated with the same user account or household account. If the speech interface devices 108A and 108B are not associated with the same account, then at 608 both audio signals 114A and 114B are processed through completion in their respective pipeline instances 126 such that each of the speech interface devices 108A and 108B are used to provide a response or action to its respectively received speech utterance.

At 610, if both speech interface devices 108A and 108B are associated with the same user account or household account, the remote speech recognition service 110 may determine, using a different pipeline instance 126 for each of the speech interface devices 108A and 108B, whether the audio signals 114A and 114B each represent the same speech utterance. In some embodiments, this may be determined by comparing first and second timestamps associated with the first and second audio signals 114A and 114B, respectively. More specifically, the difference between the first and second timestamps may be calculated and compared to a threshold. If the difference is less than the threshold, the first and second audio signals are declared to represent the same utterance. If the difference is above the threshold, the first and second audio signals are declared to represent different utterances.

At 610, the remote speech processing service 110 may also use other criteria to determine whether the first and second audio signals 114A and 114B represent the same speech utterance. For example, the audio signals 114A and 114B may be compared to each other to determine whether they are similar to each other. Specifically, at 610 the remote speech processing service 110 may calculate a cross-correlation between the first and second audio signals 114A and 114B. If there is a strong correlation between the signals, specifically if the cross-correlation exceeds a predetermined threshold, the signals are declared to represent the same utterance. As another example, ASR results with respect to the first and second audio signals 114A and 114B may be compared to determine if the audio signals represent matching sequences of words. If the ASR results for the two audio signals are identical or similar, the two audio signals may be considered to represent the same utterance. As yet another example, NLU results with respect to the first and second audio signals 114A and 1114B may be compared to each other. If the NLU results indicate that the speech corresponding to the first and second audio signals 114A and 114B represent a common intent, the two audio signals may be considered to represent the same speech utterance.

At 610, the remote speech processing service 110 may use more than one of the criteria described. For example, the audio signals may be required to satisfy two or more of the criteria in order to be declared as representing the same user utterance. Furthermore, signals having associated timestamps that vary by more than a predetermined amount may be considered to represent two different user utterances, regardless of any other similarities of the signals, of ASR results regarding the signals, or of NLU results regarding the signals.

At 610, if the remote speech processing service 110 determines that the first and second audio signals 114A and 114B do not represent the same user utterance, the remote speech processing service may move to 608 where both audio signals 114A and 114B are processed through completion in their respective pipeline instances 126 such that each of the speech interface devices 108A and 108B are used to provide a response or action to its respectively received speech utterance.

At 610, if the remote speech processing service 110 determines that the first and second audio signals 114A and 114B do represent the same speech utterance, then at 612 the remote speech processing device may perform arbitration between the speech interface devices 108A and 108B to determine which of the devices will provide a response to the single speech utterance that was detected and provided by both of the speech interface devices 108A and 108B. Arbitration performed by the remote speech processing service 110 at 612 may comprise comparing attributes indicated by the metadata 116A and 116B for each of the audio signals 114A and 114B. The device whose audio signal 114 has the strongest set of attributes is selected as the winner of the arbitration.

At 612, if the remote speech processing service 110 determines that the speech interface device 108A wins arbitration, then at 614, the audio signal 114A is processed, which includes producing an appropriate response for the speech interface device 108A to output to the user responsive to the command represented by the audio signal 114A. At 616, the remote speech processing service may cancel processing of the audio signal 114B, and abort the pipeline instance for that audio signal 114B. In some implementations, a message is sent to the speech interface device 108B informing it to not to expect a further response from the remote speech processing service 110. Note that the actions 614 and 616 may be performed in parallel or in a different order than illustrated. For example, the action 616 may be performed before the action 614.

Alternatively, at 612, if the remote speech processing service 110 determines that the speech interface device 108B wins arbitration, then at 618, the audio signal 114B is processed, which includes producing an appropriate response for the speech interface device 108B to output to the user responsive to the command represented by the audio signal 114B. At 620, the remote speech processing service may cancel processing of the audio signal 114A, and abort the pipeline instance for that audio signal 114A. In some implementations, a message is sent to the speech interface device 108A informing it to not to expect a further response from the remote speech processing service 110. Note that the actions 618 and 620 may be performed in parallel or in a different order than illustrated. For example, the action 620 may be performed before the action 618.

In some examples, however, either of the audio signals 114 may be processed regardless of who wins arbitration. While the audio signal 114A or 114B which has the highest quality signal attributes (e.g., signal-to-noise ratio, signal amplitude, etc.) may be the most efficient audio signal 114 to use, either of the audio signals 114 may be processed using ASR and NLU techniques. This is because both audio signals 114A and 114B each represent the same speech utterance, and the same results from ASR and NLU will be achieved with either signal. In some instances, regardless of which audio signal 114 is selected for processing, the speech interface device 108 is selected which is best suited to respond to the speech utterance. For instance, speech interface device 108A may be selected to respond to the speech utterance even if audio signal 114B is processed, and vice-versa.

Figure 7:
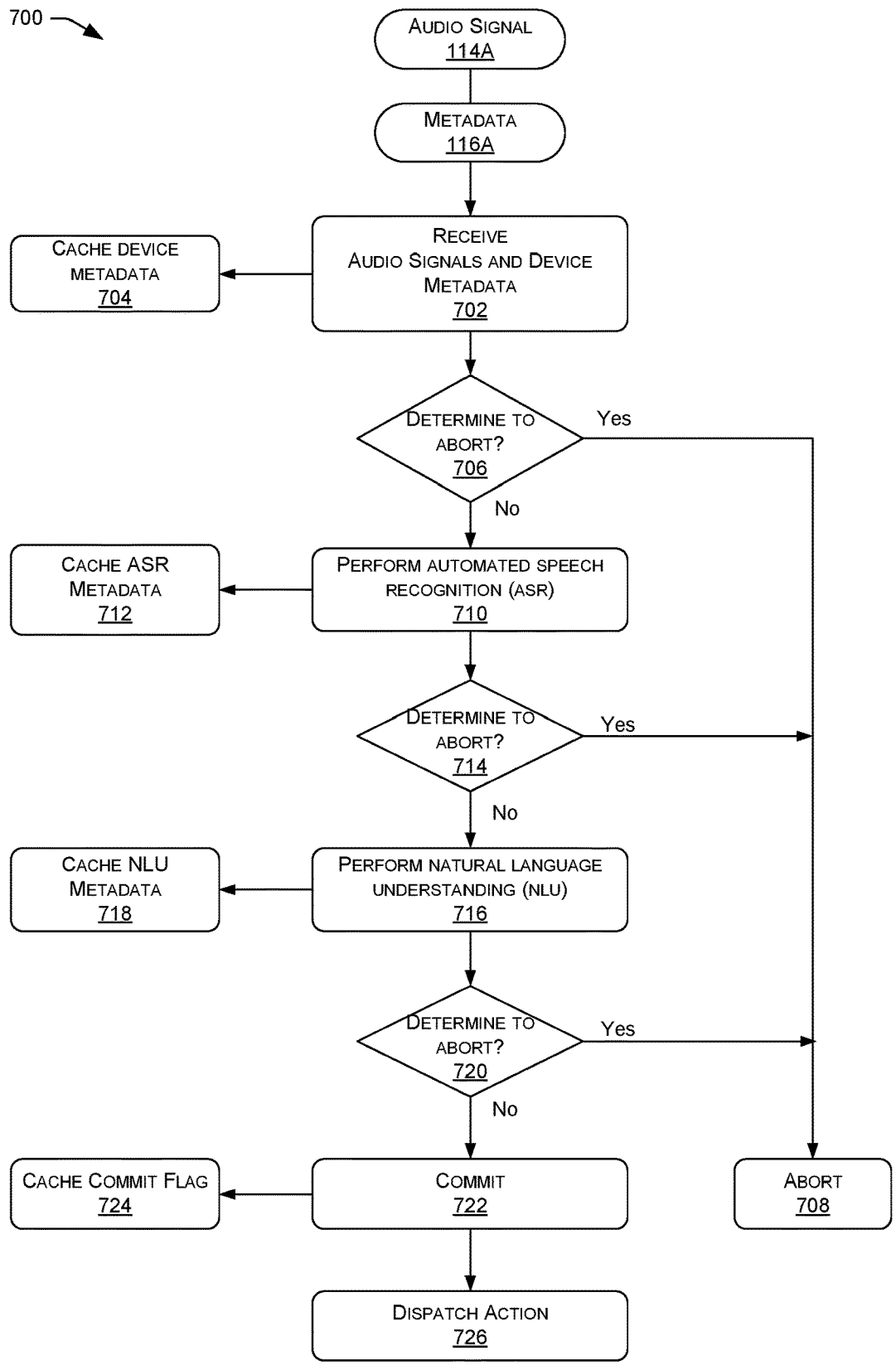
FIG. 7 is an example flow diagram illustrating another example method for processing multiple audio signals from multiple speech interface devices.

FIG. 7 is an example flow diagram illustrating another example method 700 for processing multiple audio signals 114 from multiple speech interface devices 108. The order in which the operations or steps are described is not intended to be construed as a limitation, and any number of the described operations may be combined in any order and/or in parallel to implement method 700.

In some examples, the method 700 may be performed at least partially prior to, or at least partially simultaneously with, the method 500. The remote speech processing service 110 may perform the method 700. The method 700 may be performed for each of audio signals 11A and 114B using multiple pipeline instances 126 of FIG. 1. In some examples, the method 700 is initiated in response to receiving an audio signal 114 from a speech interface device 108A.

For purposes of discussion, the audio signal being analyzed in the method 700 will be audio signal 114A. The audio signal provided by the other speech interface device 108B, which is analyzed in parallel by other instances of the method 700, will be referred to as audio signal 114B. Similarly, the metadata associated with the subject audio signal 114A will be referred to as device metadata 116A.

At 702, the remote speech processing service 110 may receive the audio signal 114A and the metadata 116A from the speech interface device 108A. The metadata 116A may include attributes of the audio signal 114A such as signal strength, detected voice level, signal-to-noise ratio, etc. The metadata 116A may include information such as the physical distance of the user 104 from the speech interface device 108A, image data, device state information, a timestamp corresponding to a time at which the user utterance was received or a wakeword was detected, configuration information, connectivity information, etc.

At 704, the remote speech processing service 110 may cache the metadata 116A in a storage location that is accessible to multiple instances of the remote speech processing service 110, such as being accessible to multiple servers and multiple processing pipeline instances 126 of the remote speech processing service 110. All pipeline instances 126 of the remote speech processing service 110 cache data in a common storage location so that each instance 126 is able to access metadata cached by the other instances.

At 706, the remote speech processing service 110 may determine whether or not to abort one of the audio signal 114A or the audio signal 116A. In some examples, if the audio signal 114A is a duplicate arbitration with respect to audio signal 116A, the pipeline instance 126 for one of the audio signal 114A or 114B may be aborted by the remote speech processing service 110 at 708. In this way, only one audio signal 114 is processed as each of the audio signals include the same speech utterance in the case of a duplicate. If the pipeline instance 126 for the audio signal 114A is aborted at 708, then method 700 ends. Alternatively, if the remote speech processing service 110 cannot determine whether the audio signal 114A is a duplicate signal with audio signal 114B, then the remote speech processing service 110 may proceed to 710.

At 710, the remote speech processing service 110 may perform automated speech recognition (ASR) 710 on the audio signal 114A. The remote speech processing service 110 may generate text data using the ASR at 710. In some examples, the remote speech processing service 110 may cache the ASR metadata at 712 in the storage location for later use by the pipeline instance 126 for the audio signals 114A.

In some examples, at 714 the remote speech processing service 110 may then analyze the text data to determine whether the words included in the text data for the audio signal 114A is the same as the words included in the text data for the audio signal 114B determined in the other pipeline instance 126. In some examples, the text data for the audio signals 114A and 114B may include the same words or sequence of words. In such examples, the remote speech processing service 110 may proceed to 708 and abort one of the pipeline instances 126 for the audio signal 114A or 114B. If the text data for the audio signals 114A and 114B determined at 710 are not the same, then the remote speech processing service 110 may proceed to 716.

At 716, the remote speech processing service 110 may perform NLU on the cached text data stored at 712 to determine an intent of the user 104 for the speech utterance 106. at 718, the remote speech processing service 110 may determine whether the intent for the audio signal 114A is the same as that determined for audio signal 114B. If the remote speech processing service 110 determines at 720 that the intents are the same, then the remote speech processing service 110 may abort one of the pipeline instances 126.

Alternatively, if the remote speech processing service 110 determines that the intents determined for the audio signals 114A and 114B are not the same, the remote speech processing service 110 proceeds to 720.

At 722, the remote speech processing service 110 may commit the speech interface device 108A to respond to the command included in the speech utterance 106 represented in the audio signal 114A. This commitment may be made known by the remote speech processing service 110 at 724 by caching a commit flag indicating that the processing of the audio signal 114A has progressed to the point where an action is about to be dispatched to the speech interface device 108A responsive to the intent represented in the audio signal 114A. Other pipeline instances 126 may read this commit flag and abort themselves based on the existence of this flag. At 726, the remote speech processing service 110 may dispatch the action to the speech interface device 108A.

While analysis of one of the pipeline instances 126 may be aborted at various stages (e.g., at 706, 714, and/or 720), that does not necessarily mean that the speech interface device 108 whose respective pipeline instance 126 was aborted does not have the action dispatched to it at 726. For instance, speech interface device 108A may have its pipeline instance 126 aborted and processing on its audio signal 114A terminated, but the action may be dispatched at 726 to the speech interface device 108A based on the result of the pipeline instance 126 determining that speech interface device 108A is the most appropriate device to have respond with the action. For instance, the speech interface device 108B may have a better signal-to-noise ratio, and the processing in a pipeline instance 126 may be performed on the audio signal 114B. However, the speech utterance 106 may indicate that the speech interface device 108A is to turn off an alarm, end a phone call, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed by the one or more processors, cause the one or more processors to perform operations comprising:
receiving a first indication that a first device generated first audio data representing a speech utterance;
receiving a second indication that a second device generated second audio data representing the speech utterance;
determining intent data associated with the speech utterance, the intent data indicating a request to perform an operation associated with a predetermined content type;
determining that, when the first indication is received, the first device is outputting content having the predetermined content type;
selecting the first device to receive a command associated with the intent data based at least in part on determining that the first device is outputting content having the predetermined content type associated with the request; and
sending command data corresponding to the command to the first device instead of the second device.

2. The system of claim 1, the operations further comprising:
identifying, from one or more words associated with the intent data, a word indicating a device state of the first device; and
wherein selecting the first device comprises selecting the first device based at least in part on the device state.

3. The system of claim 1, the operations further comprising:
identifying, from one or more words associated with the intent data, a word indicating a capability of the first device; and
wherein selecting the first device comprises selecting the first device based at least in part on the capability.

4. The system of claim 1, the operations further comprising:
determining a first confidence score associated with the intent data corresponding to a first domain associated with a first capability of the first device;
determining a second confidence score associated with the intent data corresponding to a second domain associated with a second capability of the second device; and
wherein selecting the first device comprises selecting the first device based at least in part on the first domain and the second domain.

5. The system of claim 1, wherein
the operation includes controlling output of the content on a television.

6. The system of claim 1, wherein
the operation includes controlling output of audio by a speaker.

7. The system of claim 1, the operations further comprising:
determining that the intent data is associated with a category domain of multiple category domains;
determining that the operation is associated with the category domain; and
wherein determining that the first device is outputting the content comprises determining that the first device is outputting the content based at least in part on the intent data and the operation being associated with the category domain.

8. The system of claim 1, the operations further comprising:
receiving proximity data indicating that a user is in closer proximity to the first device than the second device; and
wherein selecting the first device comprises selecting the first device based at least in part on the proximity data.

9. The system of claim 1, wherein the command data comprises first command data, and the operations further comprise:
receiving a third indication that the second device generated third audio data after the command data is sent;
determining that the third audio data is associated with the operation; and sending, based at least in part on the third audio data being associated with the operation, second command data to the first device instead of the second device.

10. The system of claim 1, the operations further comprising sending, to the second device instead of the first device, third audio data confirming performance of the command by the first device.

11. A method comprising:
receiving a first indication that a first device generated first audio data representing a speech utterance;
receiving a second indication that a second device generated second audio data representing the speech utterance;
determining intent data associated with the speech utterance, the intent data indicating a request to perform an operation associated with a predetermined content type;
determining that, when the first indication is received, the first device is outputting content having the predetermined content type;
selecting the first device to receive a command associated with the intent data based at least in part on determining that the first device is outputting content having the predetermined content type associated with the request; and
sending command data corresponding to the command to the first device instead of the second device.

12. The method of claim 11, further comprising:
identifying, from one or more words associated with the intent data, a word associated with a device state of the first device; and
wherein selecting the first device comprises selecting the first device based at least in part on the device state.

13. The method of claim 11, further comprising:
identifying, from one or more words associated with the intent data, a word associated with a capability of the first device; and
wherein selecting the first device comprises selecting the first device based at least in part on the capability.

14. The method of claim 11, further comprising:
determining a first confidence score associated with the intent data corresponding to a first domain associated with a first capability of the first device;
determining a second confidence score associated with the intent data corresponding to a second domain associated with a second capability corresponding to the second device; and
wherein selecting the first device comprises selecting the first device based at least in part on the first domain and the second domain.

15. The method of claim 11, wherein the operation includes controlling output of the content on a television.

16. The method of claim 11, wherein the operation includes controlling output of audio on a speaker.

17. The method of claim 11, further comprising:
determining that the intent data is associated with a category domain of multiple category domains;
determining that the operation is associated with the category domain; and
wherein determining that the first device is outputting the content comprises determining that the first device is outputting the content based at least in part on the intent data and the operation being associated with the category domain.

18. The method of claim 11, further comprising:
receiving proximity data indicating that a user is in closer proximity to the first device than the second device; and
wherein selecting the first device comprises selecting the first device based at least in part on the proximity data.

19. The method of claim 11, wherein the command data comprises first command data, and the method further comprises:
receiving a third indication that the second device generated third audio data after the command data is sent;
determining that the third audio data is associated with the operation; and
sending, based at least in part on the third audio data being associated with the operation, second command data to the first device instead of the second device.

20. The method of claim 11, further comprising sending, to the second device instead of the first device, third audio data confirming performance of the command by the first device.

* * * * *